(12) United States Patent
Furuta

(10) Patent No.: US 11,645,015 B2
(45) Date of Patent: May 9, 2023

(54) PRINT SYSTEM, SERVER, AND FIRST PRINTER STORES PRINT JOB DATA, AND SERVER TRANSMITS SCREEN INFORMATION, ASSOCIATED WITH THE PRINT JOB DATA, TO SECOND PRINTER WHICH EXECUTES PRINTING PROCESS ON THE PRINT JOB DATA

(71) Applicant: SEIKO EPSON CORPORATION, Tokyo (JP)

(72) Inventor: Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/316,392

(22) Filed: May 10, 2021

(65) Prior Publication Data
US 2021/0357159 A1  Nov. 18, 2021

(30) Foreign Application Priority Data
May 12, 2020  (JP) .............................. JP2020-083883

(51) Int. Cl.
*G06F 3/12* (2006.01)
*H04N 1/00* (2006.01)

(52) U.S. Cl.
CPC .......... *G06F 3/1204* (2013.01); *G06F 3/1238* (2013.01); *G06F 3/1285* (2013.01); *H04N 1/00419* (2013.01)

(58) Field of Classification Search
None
See application file for complete search history.

(56) References Cited

U.S. PATENT DOCUMENTS

| | | | | |
|---|---|---|---|---|
| 8,645,499 | B2* | 2/2014 | Nonaka | G06F 3/128 |
| | | | | 709/219 |
| 2006/0092448 | A1* | 5/2006 | Machida | G06F 3/1246 |
| | | | | 358/1.15 |
| 2006/0274362 | A1* | 12/2006 | Kita | G03G 15/5075 |
| | | | | 358/1.15 |
| 2011/0128574 | A1* | 6/2011 | Kouno | H04N 1/00482 |
| | | | | 358/1.15 |

(Continued)

FOREIGN PATENT DOCUMENTS

JP   2016-051971   4/2016

*Primary Examiner* — Haris Sabah
(74) *Attorney, Agent, or Firm* — Workman Nydegger

(57) ABSTRACT

A print system includes a first multifunction peripheral, a second multifunction peripheral configured to communicate with the first multifunction peripheral, and a server configured to communicate with the first and second multifunction peripherals. The first multifunction peripheral receives print job data from a terminal device and stores the received print job data. The server transmits an HTML file of a screen for printing associated with printing based on the print job data to the second multifunction peripheral. The second multifunction peripheral displays, based on the HTML file of the screen for printing received from the server, the screen for printing and, when a print instruction operation is performed on the displayed screen for printing, receives the print job data stored in the first multifunction peripheral from the first multifunction peripheral and executes printing based on the received print job data.

9 Claims, 14 Drawing Sheets

(56) References Cited

U.S. PATENT DOCUMENTS

| | | | |
|---|---|---|---|
| 2012/0033257 A1* | 2/2012 | Okazawa | H04L 41/22 358/1.15 |
| 2014/0126021 A1* | 5/2014 | Nakashima | G06F 3/1296 358/1.15 |
| 2015/0153984 A1* | 6/2015 | Furushige | G06F 3/1285 358/1.15 |
| 2016/0062713 A1 | 3/2016 | Oshima | |
| 2017/0039005 A1* | 2/2017 | Takemura | G06F 3/1273 |
| 2017/0192727 A1* | 7/2017 | Yun | G06F 3/1217 |
| 2019/0361636 A1* | 11/2019 | Ren | G06F 3/1232 |

* cited by examiner

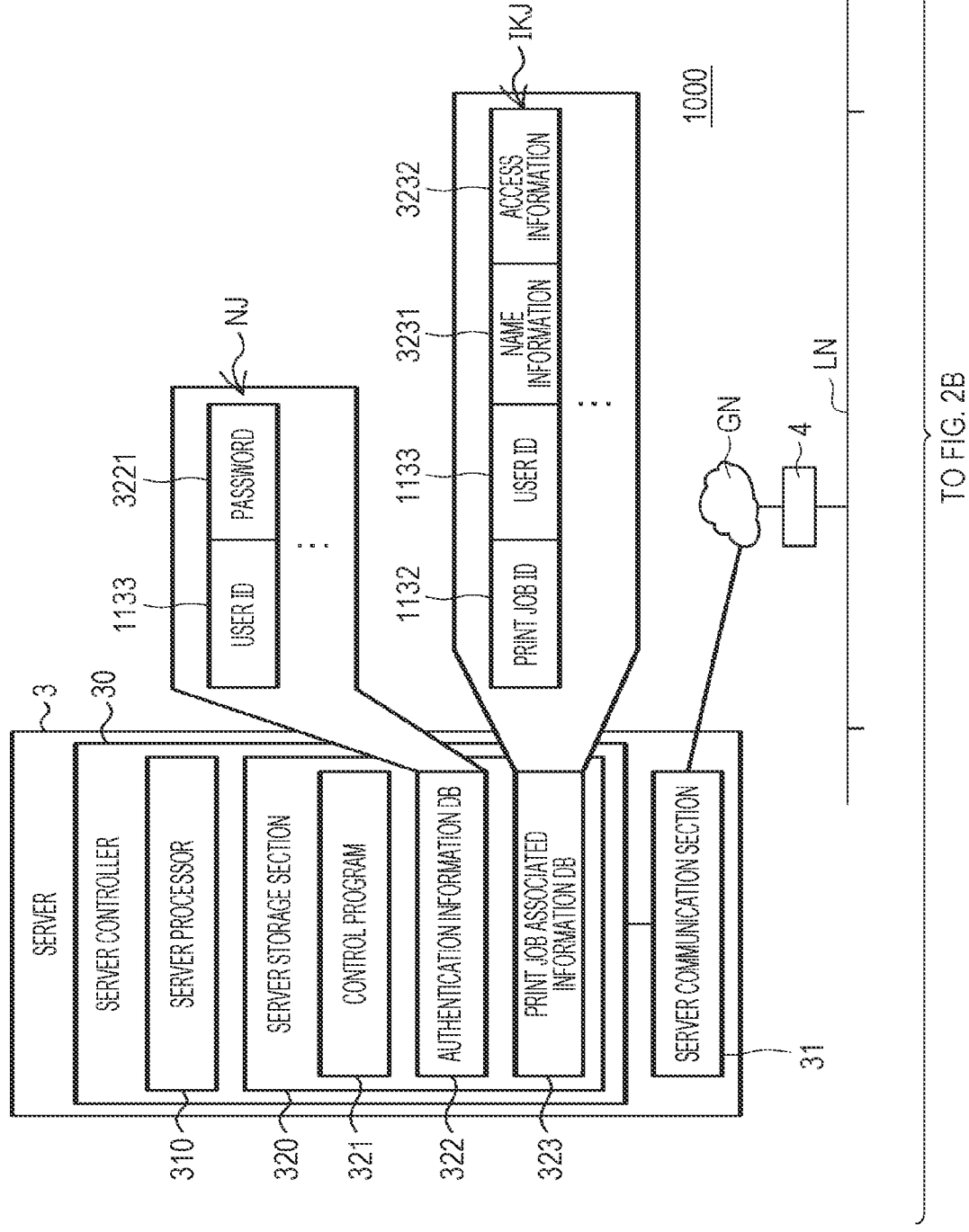

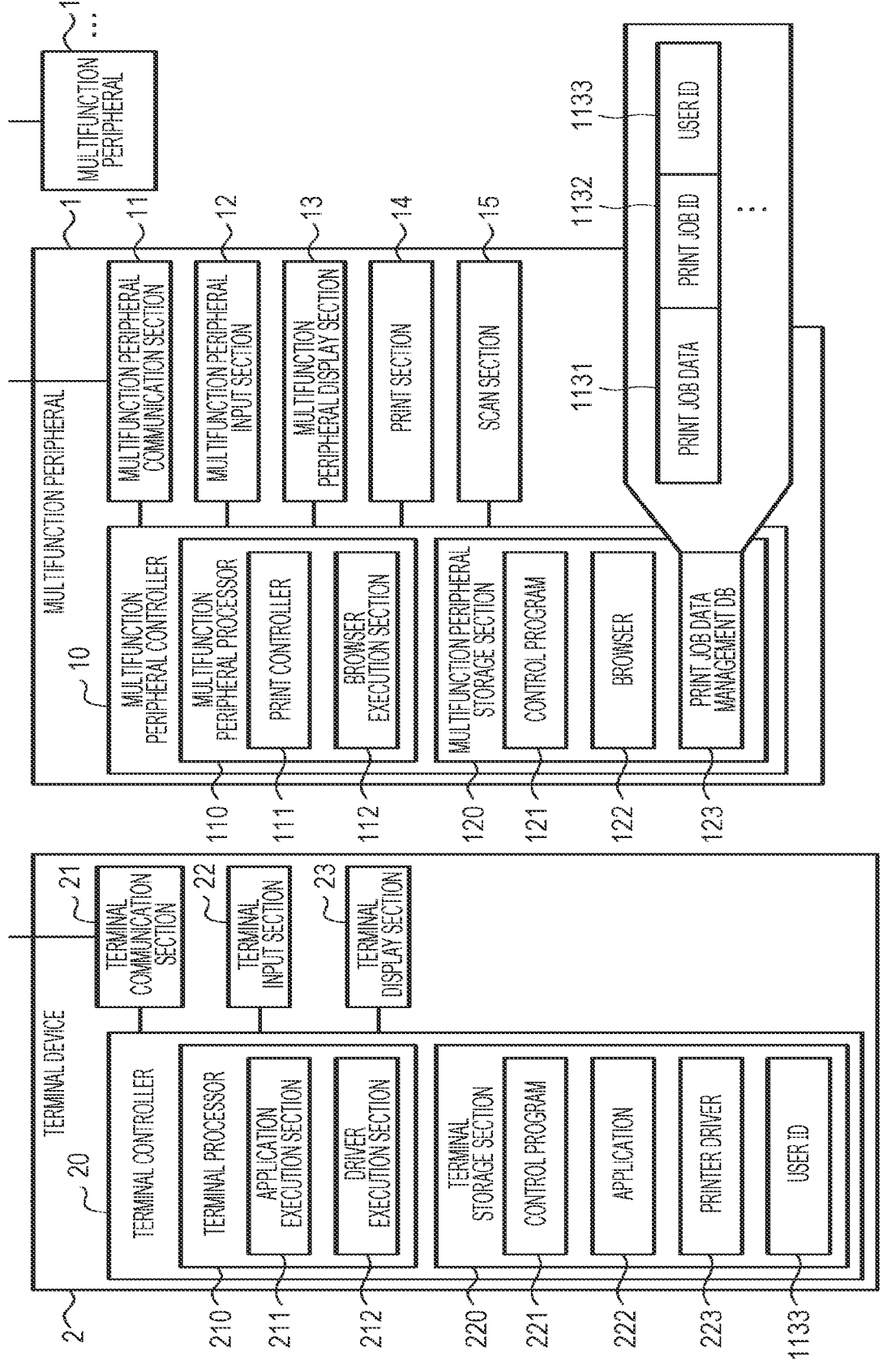

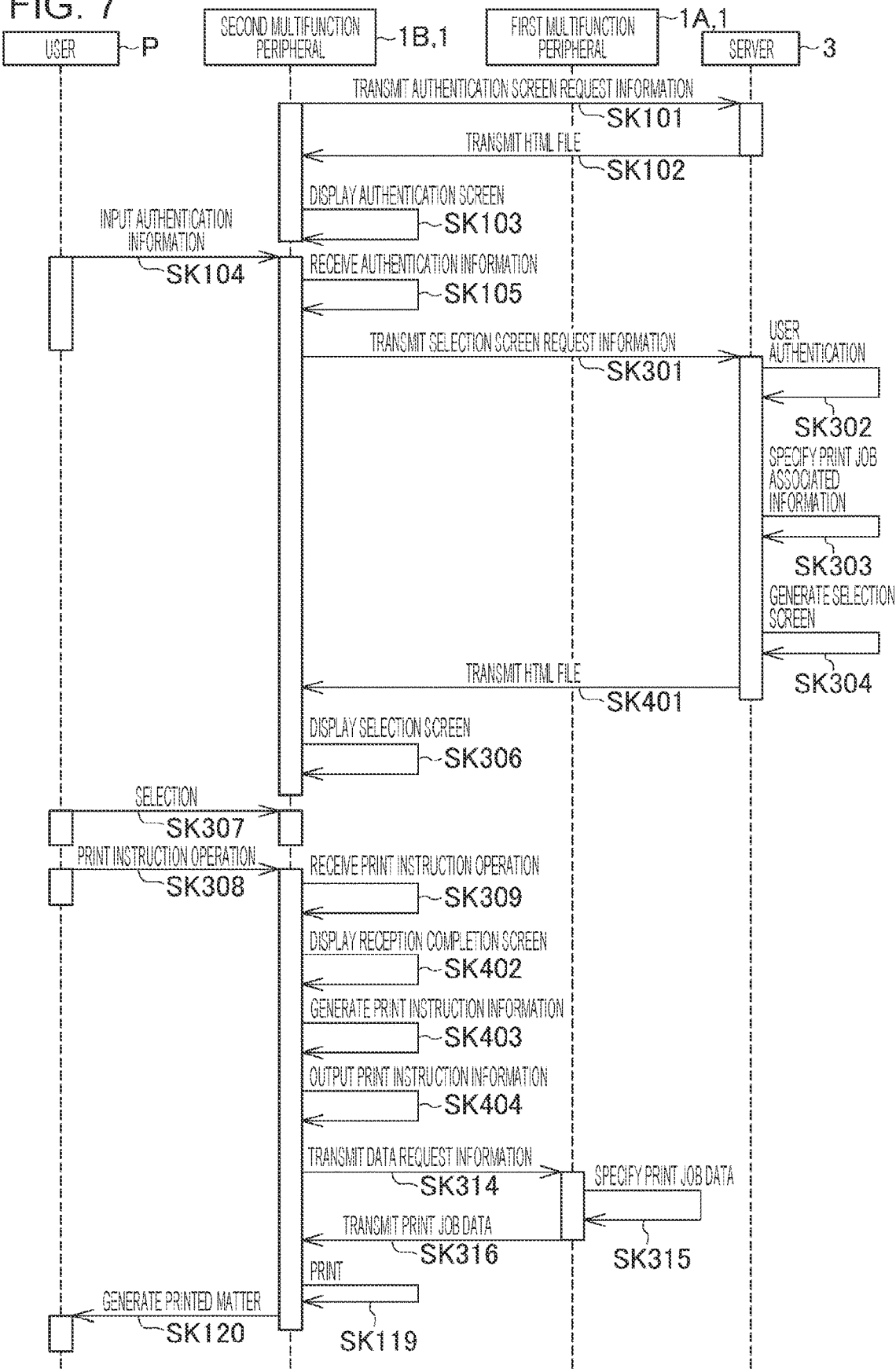

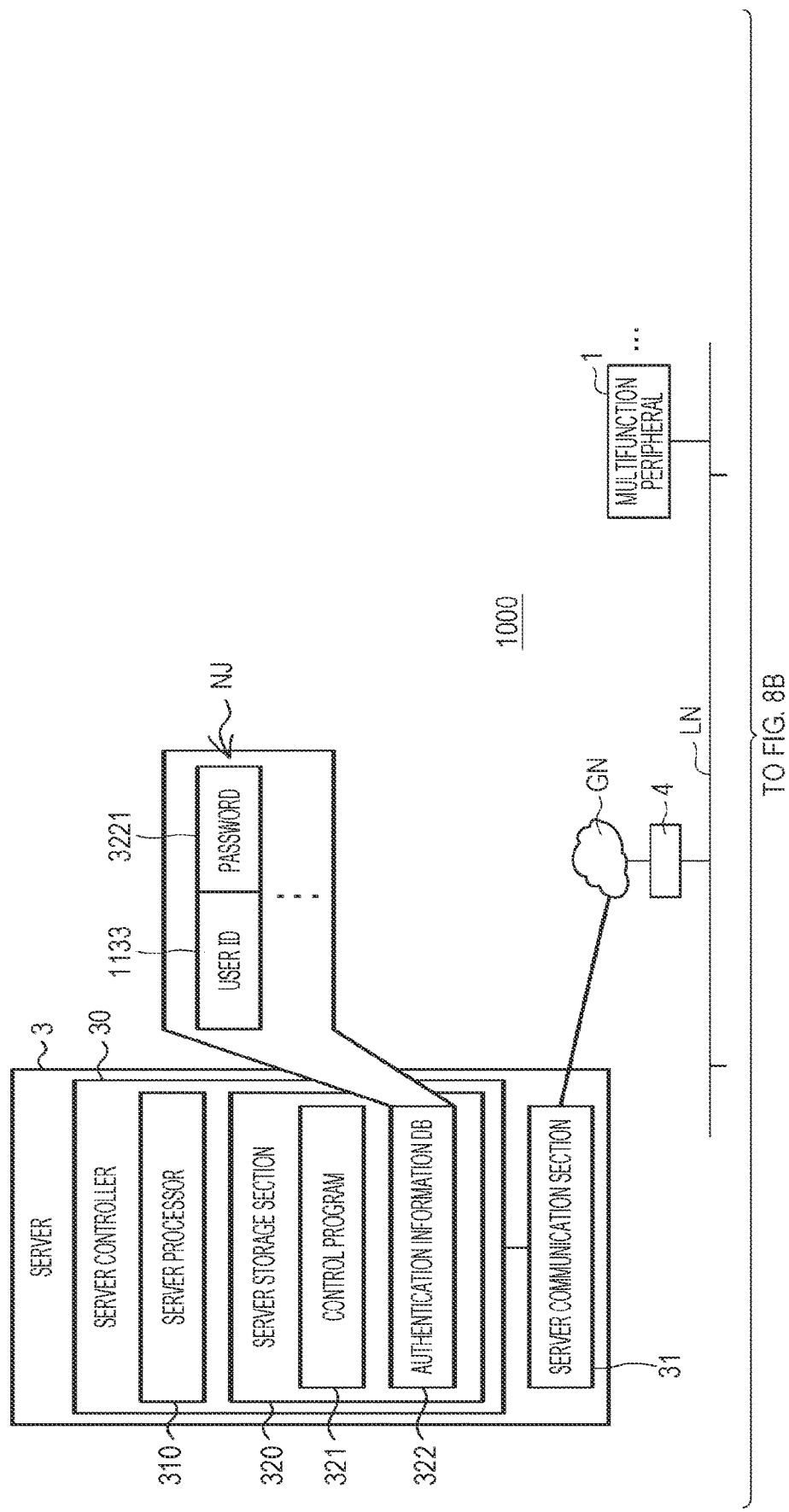

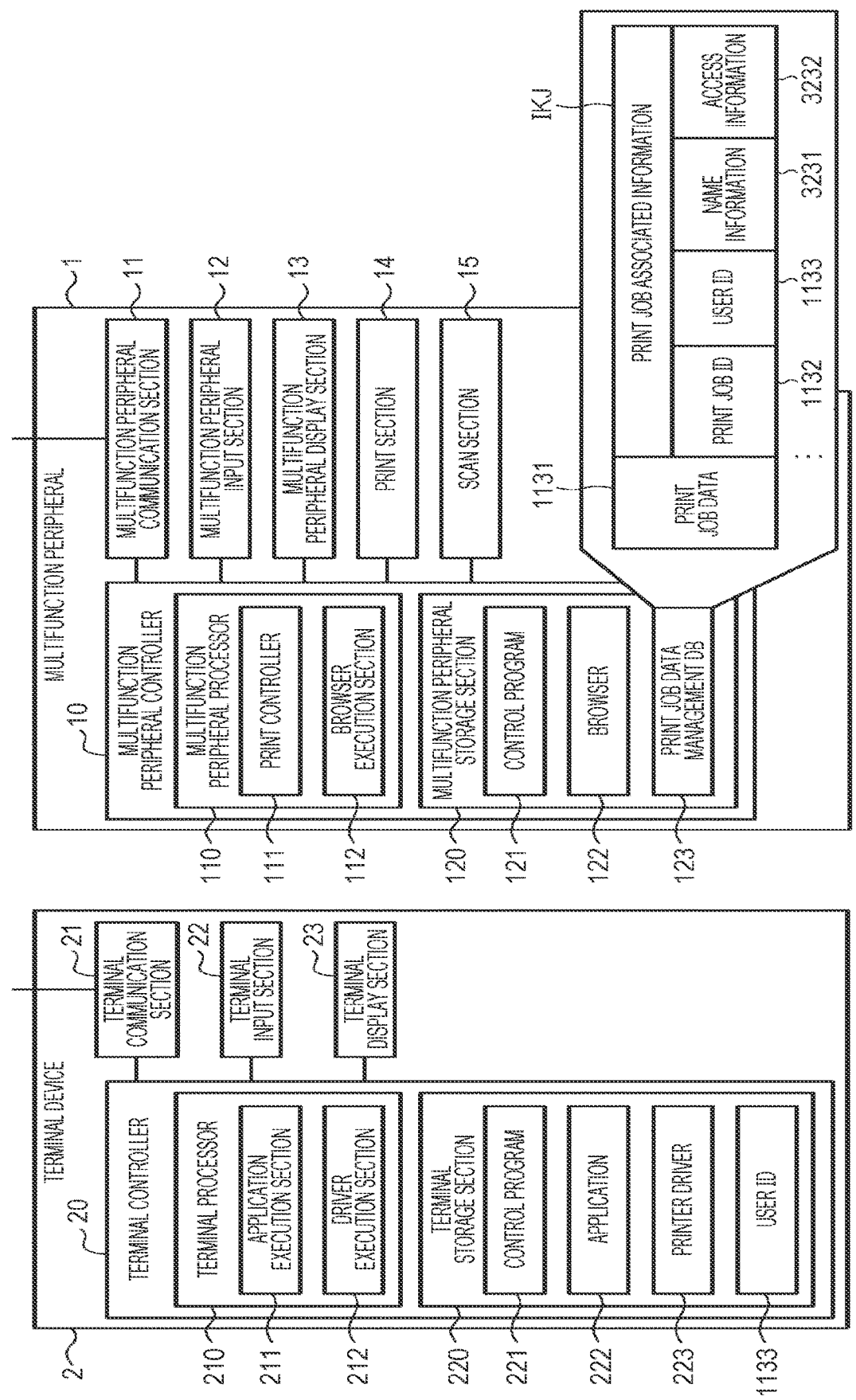

PRINT SYSTEM, SERVER, AND FIRST PRINTER STORES PRINT JOB DATA, AND SERVER TRANSMITS SCREEN INFORMATION, ASSOCIATED WITH THE PRINT JOB DATA, TO SECOND PRINTER WHICH EXECUTES PRINTING PROCESS ON THE PRINT JOB DATA

The present application is based on, and claims priority from JP Application Serial Number 2020-083883, filed May 12, 2020, the disclosure of which is hereby incorporated by reference herein in its entirety.

BACKGROUND

1. Technical Field

The present disclosure relates to a print system, a print apparatus, and a server.

2. Related Art

In general, a technique of a print apparatus performing printing through communication between the print apparatus and a server has been known. For example, JP-A-2016-051971 discloses the following technique. In a processing management system including a multifunction peripheral having a print function and a management server, when receiving a request for a print job from the multifunction peripheral, the management server transmits a print job supplied from an information terminal to the multifunction peripheral and the multifunction peripheral executes printing based on the print job supplied from the management server.

However, in JP-A-2016-051971, transmission and reception of the print job are performed by the management server before the multifunction peripheral executes printing, and therefore, there arises a problem in that the amount of communication in the system is large.

SUMMARY

According to an aspect of the present disclosure, a print system includes a first print apparatus, a second print apparatus configured to communicate with the first print apparatus, and a server configured to communicate with the first print apparatus and the second print apparatus. The first print apparatus receives print job data from a terminal device and stores the received print job data. The server transmits screen information that is information on a screen associated with printing based on the print job data to the second print apparatus. The second print apparatus displays, based on the screen information received from the server, the screen and, when a print instruction operation is performed on the displayed screen, receives the print job data stored in the first print apparatus from the first print apparatus and executes printing based on the received print job data when the print instruction operation is performed on the screen and executes printing based on the received print job data.

According to another aspect of the present disclosure, a print apparatus includes a print apparatus communication section configured to communicate with a terminal device, a first print apparatus storing print job data supplied from the terminal device, and a server, a print section, a display section, and a print apparatus controller. The print apparatus controller receives, from the server through the print apparatus communication section, screen information that is information on a screen associated with printing based on the print job data, and displays, based on the received screen information, the screen in the display section and, when a print instruction operation is performed on the screen displayed in the display section, receives, from the first print apparatus through the print apparatus communication section, the print job data stored in the first print apparatus and executes, by using the print section, printing based on the received print job data.

According to a further aspect of the present disclosure, a server includes a server communication section that communicates with a first print apparatus, storing print job data supplied from a terminal device, and a second print apparatus and a server controller that transmits, to the second print apparatus through the server communication section, screen information that is information on a screen associated with printing based on the print job data. The screen information includes a program for causing, when a print instruction operation is performed on the screen, the second print apparatus to receive the print job data stored in the first print apparatus from the first print apparatus and to execute printing based on the received print job data.

According to a still further aspect of the present disclosure, a print method performed by a first print apparatus, a second print apparatus communicating with the first print apparatus, and a server communicating with the first print apparatus and the second print apparatus. The first print apparatus receives print job data from a terminal device and stores the received print job data. The server transmits screen information that is information on a screen associated with printing based on the print job data to the second print apparatus. The second print apparatus displays the screen based on the screen information received from the server, and when a print instruction operation is performed on the displayed screen, receives the print job data stored in the first print apparatus from the first print apparatus and executes printing based on the received print job data.

BRIEF DESCRIPTION OF THE DRAWINGS

FIGS. 2A and 2B are block diagrams illustrating functional configurations of a multifunction peripheral, a terminal device, and a server.

FIG. 7 is a sequence diagram illustrating operation of the print system.

FIGS. 8A and 8B are block diagrams illustrating functional configurations of a multifunction peripheral, a terminal device, and a server.

DESCRIPTION OF EXEMPLARY EMBODIMENTS

Figure 1:
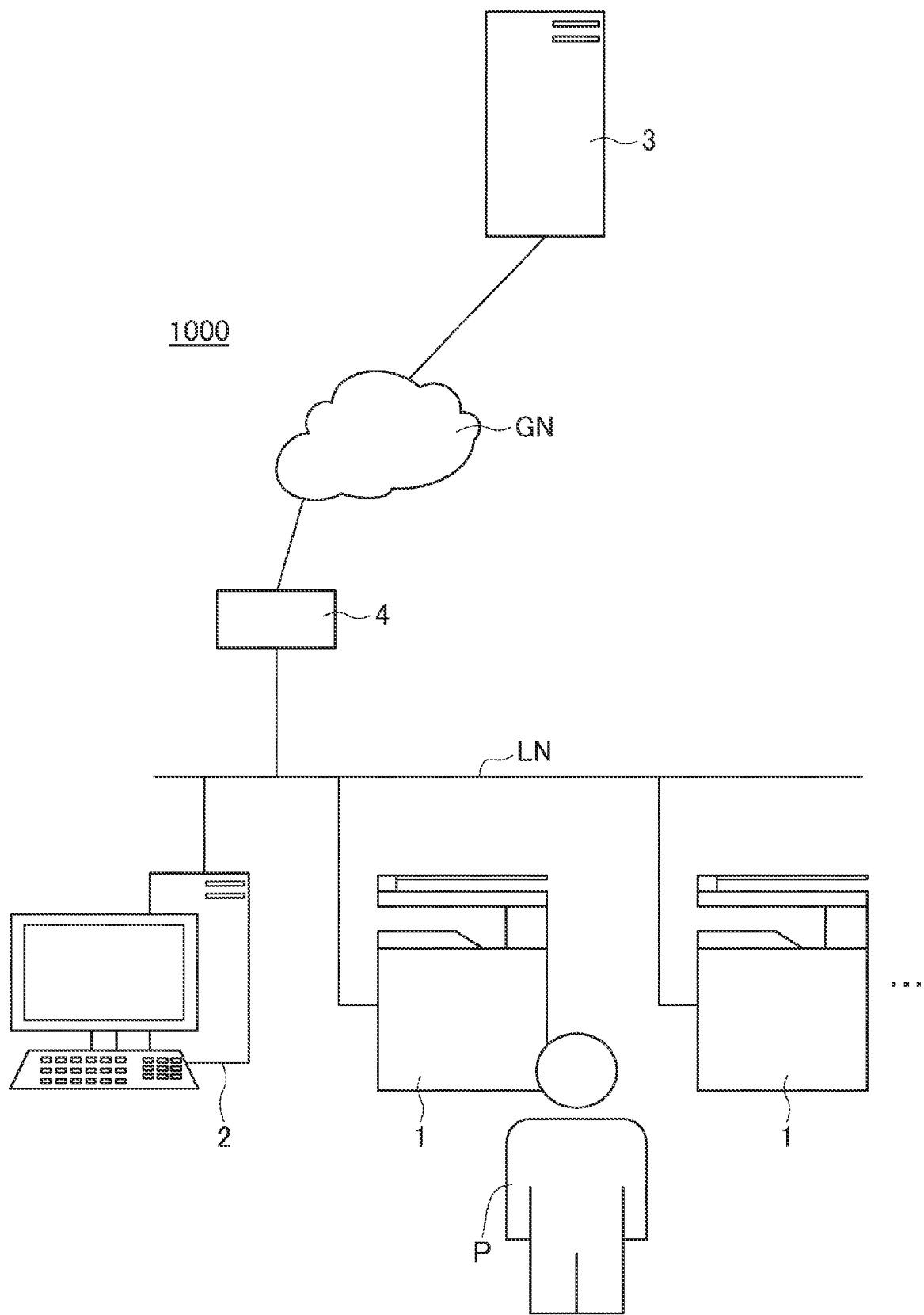
FIG. 1 is a diagram illustrating a configuration of a print system.

FIG. 1 is a diagram illustrating a configuration of a print system 1000.

As illustrated in FIG. 1, the print system 1000 includes a plurality of multifunction peripherals 1, a terminal device 2, and a server 3. The plurality of multifunction peripherals 1 and the terminal device 2 are connected to a local network LN. The server 3 is connected to a global network GN.

The print system 1000 has a function of authentication printing.

In the authentication printing, one of the multifunction peripherals 1 receives a user authentication operation performed by a user P, the server 3 performs the user authentication based on the received user authentication operation, and the multifunction peripheral 1 that has received the user authentication operation performs printing based on a print job desired by the user P when the user authentication is successfully performed. The authentication printing may prevent leakage of information printed on a printed matter to a third party caused due to execution of printing based on the print job desired by the user P in a multifunction peripheral 1 installed in a location separated from the user P. Furthermore, since printing based on the print job desired by the user P may be performed by any one of the multifunction peripherals 1, the print system 1000 is highly convenient for the user P.

Note that a single print job indicates a series of operations of generating at least one printed matter by printing. When a plurality of printed matters are to be generated, a single print job indicates a series of operations of generating printed matters having the same print content. For example, when 10 printed matters of the same content are to be generated, a single print job indicates a series of operations of generating 10 printed matters. As described below, data for executing a print job is referred to as "print job data" and is indicated by a reference numeral "1131".

Each of the multifunction peripherals 1 is abbreviated as an MFP and is capable of executing various processes including printing and scanning. The multifunction peripherals 1 execute various processes based on the print job data 1131 supplied from the terminal device 2, and furthermore, execute various processes based on operations performed by the user P on an input section including an operation switch and a touch panel disposed on the multifunction peripherals 1.

Each of the multifunction peripherals 1 stores the received print job data 1131 in a multifunction peripheral storage section 120 described below when receiving the print job data 1131 generated by the terminal device 2 from the terminal device 2. When one of the multifunction peripherals 1 receives the user authentication operation and the server 3 successfully performs the user authentication, printing is performed based on the print job data 1131 of the user P stored in another one of the multifunction peripherals 1. Note that, when one of the multifunction peripherals 1 receives the user authentication operation and the user authentication is successfully performed by the server 3, printing may be executed based on the print job data 1131 of the user P stored in the multifunction peripheral 1.

The terminal device 2 is a personal computer (PC). Although the terminal device 2 is a desktop type terminal device in FIG. 1, the terminal device 2 may be a laptop type terminal device or a tablet type terminal device. The terminal device 2 generates the print job data 1131 to be transmitted to the multifunction peripherals 1.

The server 3 is a server apparatus that provides a screen associated with printing based on the print job data 1131 stored in the multifunction peripherals 1 to the multifunction peripherals 1. As described below, the screen is referred to as a "screen for printing". The server 3 functioning as a Web server transmits an HTML file for displaying the screen for printing to the multifunction peripherals 1. The HTML file for displaying the screen for printing corresponds to an example of screen information. The server 3 connected to the global network GN communicates with various devices connected to the local network LN through the communication device 4 connected to the global network GN. Examples of the global network GN include the Internet, a telephone network, and other communication networks.

The communication device 4 functions as an interface device for connecting a device connected to the local network LN to the global network GN. The communication device 4 has various functions including a modem function, a firewall function, a router function, and a network address translation (NAT) function. The communication device 4 transfers data transmitted and received between the multifunction peripheral 1 connected to the local network LN and the server 3 connected to the global network GN. The communication device 4 further transfers data transmitted and received between the terminal device 2 connected to the local network LN and the server 3 connected to the global network GN.

Note that, although an example in which the print system 1000 includes the single terminal device 2 is illustrated in this embodiment, the number of terminal devices 2 included in the print system 1000 is not limited to 1 and a plurality of terminal devices 2 may be included in the print system 1000.

FIGS. 2A and 2B are block diagrams illustrating functional configurations of the multifunction peripherals 1, the terminal device 2, and the server 3.

First, the multifunction peripherals 1 will be described.

Each of the multifunction peripherals 1 includes a multifunction peripheral controller 10, a multifunction peripheral communication section 11, a multifunction peripheral input section 12, a multifunction peripheral display section 13, a print section 14, and a scan section 15. The multifunction peripheral controller 10 corresponds to an example of a print apparatus controller. Furthermore, the multifunction peripheral communication section 11 corresponds to an example of a print apparatus communication section. Furthermore, the multifunction peripheral display section 13 corresponds to an example of a display section.

The multifunction peripheral controller 10 including a multifunction peripheral processor 110 that executes programs of a central processing unit (CPU), a micro processing unit (MPU), and the like and a multifunction peripheral storage section 120 controls various sections included in the multifunction peripheral 1. The multifunction peripheral controller 10 executes various processes through cooperation of hardware and software such that the multifunction peripheral processor 110 executes a process by reading a control program 121 stored in the multifunction peripheral storage section 120. The multifunction peripheral controller 10 functions as a print controller 111 when the multifunction peripheral processor 110 reads and executes the control program 121. Furthermore, the multifunction peripheral controller 10 functions as a browser execution section 112 when the multifunction peripheral processor 110 reads and executes a browser 122.

The multifunction peripheral storage section 120 includes a storage region for storing programs to be executed by the multifunction peripheral processor 110 and data to be processed by the multifunction peripheral processor 110. The multifunction peripheral storage section 120 stores the control program 121 to be executed by the multifunction peripheral processor 110, the browser 122, a print job data management DB 123, and various other data. The multifunction peripheral storage section 120 includes a nonvolatile storage region for storing programs and data in a nonvolatile manner. The multifunction peripheral storage section 120 may further include a volatile storage region serving as a work area for temporarily storing programs to be executed by the multifunction peripheral processor 110 and data to be processed.

The print job data management DB 123 stores the print job data 1131. As illustrated in FIG. 2B, a single record of the print job data management DB 123 includes the print job data 1131, a print job ID 1132, and a user ID 1133.

The print job ID 1132 is identification information for identifying a print job. Note that the print job ID 1132 also corresponds to identification information for identifying the print job data 1131.

The user ID 1133 is identification information for identifying the user P in authentication printing. The user ID 1133 is uniquely assigned to each user P in advance.

Referring back to FIGS. 2A and 2B, the multifunction peripheral communication section 11 including communication hardware based on a predetermined communication standard communicates with the terminal device 2 and the server 3 in accordance with the predetermined communication standard under control of the multifunction peripheral controller 10.

The multifunction peripheral input section 12 including an input unit disposed on the multifunction peripheral 1 detects an operation performed by the user P on the input section and outputs the detected operation to the multifunction peripheral controller 10. Examples of the multifunction peripheral input section 12 are an operation switch and a touch panel. The multifunction peripheral controller 10 executes a process corresponding to the operation performed on the input unit based on the input performed using the multifunction peripheral input section 12. The multifunction input section 12 includes an input unit used by the user P to input authentication information NJ to the multifunction peripheral 1. Examples of the input unit include a card reader reading an IC card or the like storing the authentication information NJ of the user P. Note that an input method performed by the user P is not limited to this example, and the following method may be employed. That is, the user P may input a combination of the user ID 1133 and a password 3221 to the operation switch or the touch panel as the authentication information NJ or may input the authentication information NJ by fingerprint authentication. Although the combination of the user ID 1133 and the password 3221 is illustrated as the authentication information NJ in this embodiment, the authentication information NJ is not limited to this and may be information indicating a fingerprint in the fingerprint authentication, for example.

The multifunction peripheral display section 13 including a plurality of LEDs and a display panel executes switching-on, switching-off, and blinking of the LEDs in a predetermined manner, display of information on the display panel, and the like under control of the multifunction peripheral controller 10.

The print section 14 includes components associated with printing, such as an ink jet head forming dots by ejecting ink onto a print medium, a carriage moving the ink jet head in a scanning direction, a carriage driving motor driving the carriage, a transport unit transporting the print medium, and an ink supply unit supplying ink to the ink jet head. The print section 14 performs printing on a print medium by ejecting ink from nozzles of the ink jet head so as to form dots on a print surface of the transported print medium under control of the multifunction peripheral controller 10.

The scan section 15 includes a component associated with reading, such as a scanner reading text and images recorded on a document. The scan section 15 reads recorded text and images by applying light emitted from a light source to a document and outputs image data obtained by the reading to the multifunction peripheral controller 10, for example. The multifunction peripheral controller 10 performs data processing including an RGB conversion and a compression process on the image data supplied from the scan section 15 so as to generate data in a predetermined format. Thereafter, the multifunction peripheral controller 10 stores the generated data in the predetermined format in the multifunction peripheral storage section 120.

Next, the terminal device 2 will be described.

The terminal device 2 includes a terminal controller 20, a terminal communication section 21, a terminal input section 22, and a terminal display section 23.

The terminal controller 20 including a terminal processor 210 that executes programs of a CPU, an MPU, and the like and a terminal storage section 220 controls various sections included in the terminal device 2. The terminal controller 20 executes various processes through cooperation of hardware and software such that the terminal processor 210 executes a process by reading a control program 221 stored in the terminal storage section 220. Furthermore, the terminal controller 20 functions as an application execution section 211 when the terminal processor 210 executes an application 222 stored in the terminal storage section 220. Moreover, the terminal controller 20 functions as a driver execution section 212 when the terminal processor 210 executes a printer driver 223 stored in the terminal storage section 220.

The terminal storage section 220 includes a storage region for storing programs to be executed by the terminal processor 210 and data to be processed by the terminal processor 210. The terminal storage section 220 stores the control program 221 to be executed by the terminal processor 210, the application 222, the printer driver 223, the user ID 1133, and various other data. The terminal storage section 220 includes a nonvolatile storage region for storing programs and data in a nonvolatile manner. Furthermore, the terminal storage section 220 may further include a volatile storage region serving as a work area for temporarily storing programs to be executed by the terminal processor 210 and data to be processed.

The terminal communication section 21 including communication hardware based on a predetermined communication standard communicates with the multifunction peripheral 1 and the server 3 under control of the terminal controller 20.

The terminal input section 22 including an input unit, examples of which include an operation switch disposed on the terminal device 2, a touch panel, a mouse, and a keyboard, detects an operation performed by the user P on the input section and outputs a result of the detection to the terminal controller 20. The terminal controller 20 executes a process corresponding to an operation performed on the input unit based on the input performed using the terminal input section 22.

The terminal display section 23 including LEDs and a display panel executes switching-on, switching-off, and blinking of the LEDs in a predetermined manner, display of information on the display panel, and the like under control of the terminal controller 20.

Next, the server 3 will be described.

The server 3 includes a server controller 30 and a server communication section 31.

The server controller 30 including a server processor 310 that executes programs of a CPU, an MPU, and the like and a server storage section 320 controls various sections included in the server 3. The server controller 30 executes various processes through cooperation of hardware and software such that the server processor 310 executes a process by reading a control program 321 stored in the server storage section 320.

The server storage section 320 includes a storage region for storing programs to be executed by the server processor 310 and data to be processed by the server processor 310. The server storage section 320 stores a control program 321 to be executed by the server processor 310, an authentication information DB 322, a print job associated information DB 323, and various other data. The server storage section 320 includes a nonvolatile storage region for storing programs and data in a nonvolatile manner. The server storage section 320 may further include a volatile storage region serving as a work area for temporarily storing programs to be executed by the server processor 310 and data to be processed.

The authentication information DB 322 is a database storing the authentication information NJ as records. Each record stored in the authentication information DB 322 has a combination of the user ID 1133 and a password 3221.

The print job associated information DB 323 is a database storing print job associated information IKJ as records. The print job associated information IKJ includes a print job ID 1132, the user ID 1133, name information 3231, and access information 3232. That is, each record stored in the print job associated information DB 323 includes the print job ID 1132, the user ID 1133, the name information 3231, and the access information 3232.

The name information 3231 indicates a data name of the print job data 1131 indicated by the print job ID 1132 associated with the name information 3231 in the same record. The data name indicated by the name information 3231 is appropriately set by the user P or automatically set by the application execution section 211, for example.

The access information 3232 is used to access the multifunction peripheral 1 storing the print job data 1131 indicated by the print job ID 1132 associated with the access information 3232 in the same record. The access information 3232 is address information in the local network LN, for example.

Note that the print job associated information IKJ includes at least the print job ID 1132, the user ID 1133, and the access information 3232, and may include information different from the name information 3231 instead of or in addition to the name information 3231.

The server communication section 31 including communication hardware based on a predetermined communication standard communicates with the multifunction peripheral 1 and the terminal device 2 under control of the server controller 30.

Next, operation of the print system 1000 will be described through descriptions of the print controller 111, the browser execution section 112, the application execution section 211, and the driver execution section 212.

First, operation of the print system 1000 performed until the multifunction peripheral 1 stores the print job data 1131 in the print job data management DB 123 will be described.

Figure 3:
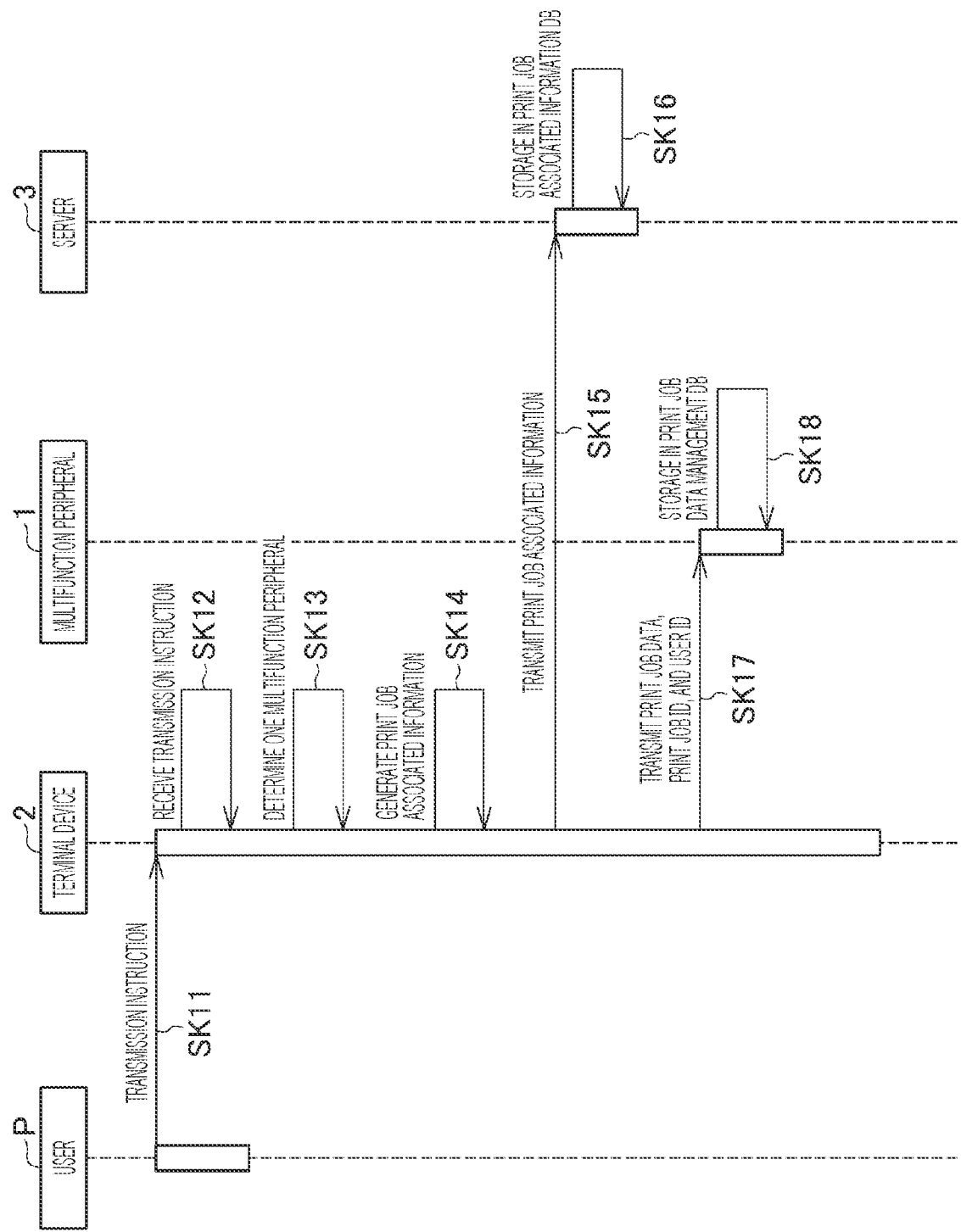
FIG. 3 is a sequence diagram illustrating operation of the print system.

FIG. 3 is a sequence diagram illustrating operation of the print system 1000. It is assumed that, at a time point of starting the sequence in FIG. 3, the terminal device 2 generates the print job data 1131 based on an operation performed by the user P.

The generation of the print job data 1131 will now be described.

The application execution section 211 of the terminal controller 20 generates, based on an operation performed by the user P on the terminal device 2, image data corresponding to an image to be printed by the multifunction peripheral 1 by using a function of the application 222 installed in the terminal device 2 in advance. The driver execution section 212 generates, based on the image data generated, the print job data 1131 by the application execution section 211 by using a function of the printer driver 223 installed in the terminal device 2 in advance. The print job data 1131 includes image data generated by the application execution section 211, various commands for printing an image corresponding to the image data, and information on the number of copies to be generated. Note that the various commands included in the print job data 1131 are compatible with a command specification of the multifunction peripheral 1.

The user P issues a transmission instruction for transmitting the print job data 1131 generated by the terminal device 2 to the multifunction peripheral 1 to the terminal device 2 (step SK11).

When receiving the transmission instruction issued by the user P (step SK12), the driver execution section 212 of the terminal device 2 determines one of the multifunction peripherals 1 to which the generated print job data 1131 is to be transmitted (step SK13).

In step SK13, the driver execution section 212 may determine a predetermined one of the multifunction peripherals 1 or may determine one of the multifunction peripherals 1 in accordance with a predetermined criterion or predetermined order among the plurality of multifunction peripherals 1 connected to the local network LN.

When determining one of the multifunction peripherals 1 to which the print job data 1131 is to be transmitted, the driver execution section 212 generates print job associated information IKJ (step SK14).

For example, the driver execution section 212 generates the print job ID 1132 and the name information 3231 in step SK14. Thereafter, the driver execution section 212 generates the print job associated information IKJ by associating the print job ID 1132, the name information 3231, the user ID 1133 stored in the terminal storage section 220, and the access information 3232 of the multifunction peripheral 1 determined in step SK13 with one another. Note that it is not necessary for the driver execution section 212 to generate the print job ID 1132 in step SK14 when the print job ID 1132 is generated before execution of step SK14. The same applies to the name information 3231.

Next, the driver execution section 212 transmits the generated print job associated information IKJ through the terminal communication section 21 to the server 3 (step SK15).

When receiving the print job associated information IKJ through the server communication section 31, the server controller 30 of the server 3 stores the received print job associated information IKJ as a single record in the print job associated information DB 323 (step SK16).

Referring back to the description of the terminal device 2, the driver execution section 212 transmits the generated print job data 1131, the print job ID 1132, and the user ID 1133 through the terminal communication section 21 to the multifunction peripheral 1 determined in step SK13 (step SK17).

When receiving the print job data 1131, the print job ID 1132, and the user ID 1133, the multifunction peripheral controller 10 of the multifunction peripheral 1 stores the record including the received information in the print job data management DB 123 (step SK18).

Although the terminal device 2 performs information transmission to the multifunction peripheral 1 after performing information transmission to the server 3 in the operation of the terminal device 2 illustrated in FIG. 3, order of the information transmission may be reversed. Furthermore, the terminal device 2 may simultaneously perform the information transmission to the server 3 and the multifunction peripheral 1.

First, operation of the print system 1000 performed after the multifunction peripheral 1 stores the print job data 1131 in the print job data management DB 123 will be described. The description of operation of the print system 1000 is divided into the multifunction peripheral 1 executing printing of all the print job data 1131 associated with the user P and executing printing of the print job data selected by the user P among the print job data 1131 associated with the user P.

As described below, the former is referred to as a "first example", and the latter is referred to as a "second example".

Furthermore, as described below, the multifunction peripheral 1 operated by the user P to generate a printed matter is referred to as a "second multifunction peripheral" indicated by reference symbol "1B", and the multifunction peripherals 1 other than the second multifunction peripheral 1B are referred to as "first multifunction peripherals" indicated by reference symbol "1A". The first multifunction peripherals 1A correspond to an example of a first print apparatus. The second multifunction peripheral 1B corresponds to an example of a second print apparatus and an example of a print apparatus.

First Example

First, operation of the print system 1000 in the first example will be described. In the description in the first example, the second multifunction peripheral 1B executing printing based on the print job data 1131 stored in one of the first multifunction peripherals 1A will be illustrated.

Figure 4:
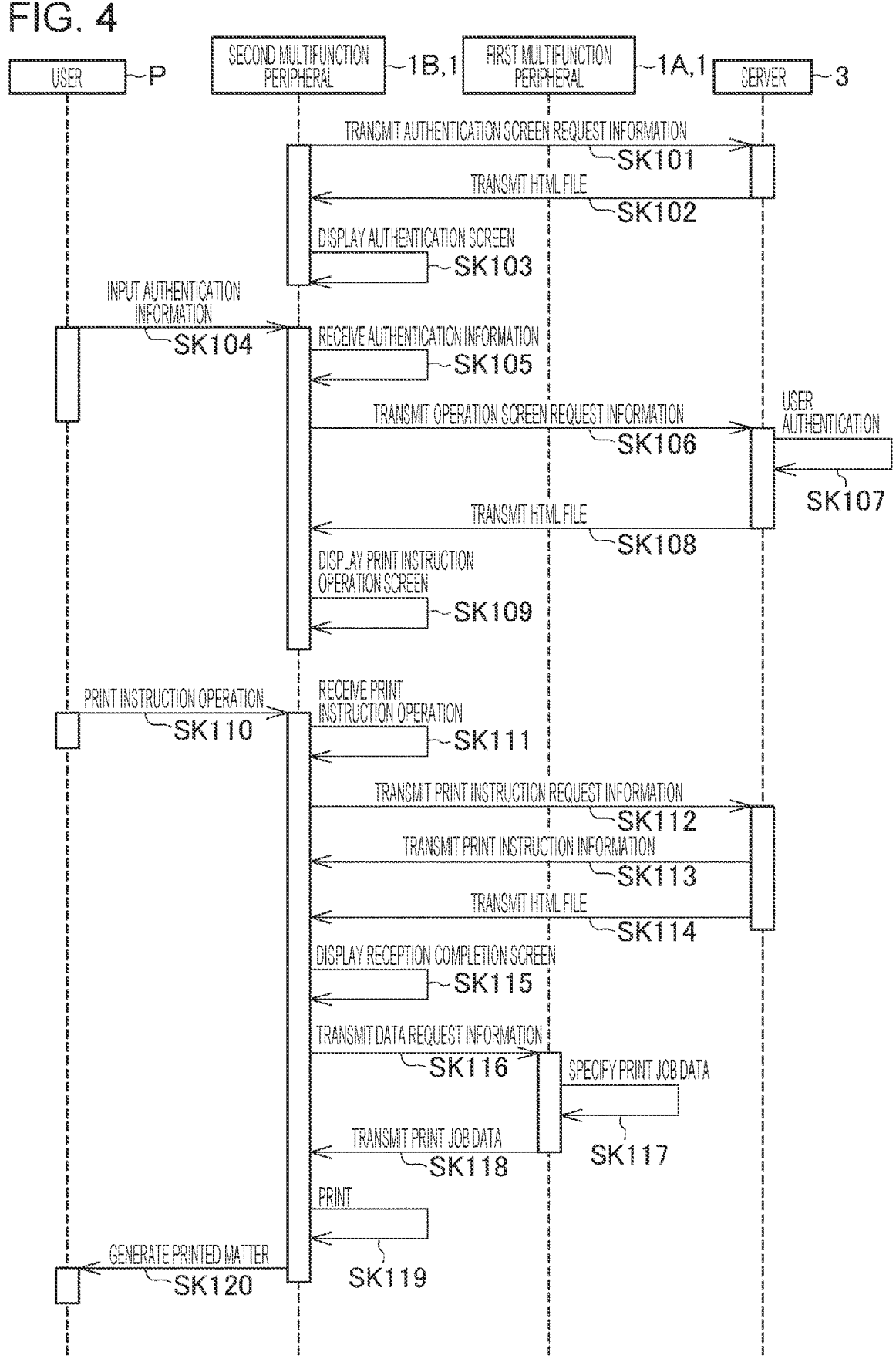
FIG. 4 is a sequence diagram illustrating operation of the print system.

FIG. 4 is a sequence diagram illustrating operation of the print system 1000.

The browser execution section 112 of the second multifunction peripheral 1B transmits authentication screen request information to the server 3 through the multifunction peripheral communication section 11 (step SK 101). The authentication screen request information requests an HTML file for displaying an authentication screen associated with user authentication.

When receiving the authentication screen request information through the server communication section 31, the server controller 30 transmits the HTML file for displaying the authentication screen to the second multifunction peripheral 1B (step SK102) through the server communication section 31.

When receiving the HTML file for displaying the authentication screen through the multifunction peripheral communication section 11, the browser execution section 112 of the second multifunction peripheral 1B displays the authentication screen using the multifunction peripheral display section 13 (step SK103).

The authentication screen includes information prompting input of the authentication information NJ, such as a message "Pass IC card over card reader" or a message "Input user ID and password".

The user P inputs the authentication information NJ to the second multifunction peripheral 1B based on the authentication screen displayed by the second multifunction peripheral 1B (step SK104).

The browser execution section 112 of the second multifunction peripheral 1B receives the authentication information NJ input by the user P (step SK105).

Next, the browser execution section 112 of the second multifunction peripheral 1B transmits operation screen request information to the server 3 through the multifunction peripheral communication section 11 (step SK 106). The operation screen request information requests an HTML file for displaying a print instruction operation screen used by the user P performing a print instruction operation. The operation screen request information includes the authentication information NJ input by the user P. The print instruction operation screen is a screen for printing provided to the multifunction peripherals 1 by the server 3. Accordingly, the HTML file for displaying the print instruction operation screen corresponds to an example of screen information.

When receiving the operation screen request information, the server controller 30 performs user authentication based on the authentication information NJ included in the received operation screen request information (step SK107).

In step SK107, by referring to the authentication information DB 322, the server controller 30 determines whether the authentication information NJ included in the received operation screen request information is stored in the authentication information DB 322 as a single record. When determining that the authentication information NJ is not stored, the server controller 30 determines that the user authentication has failed, and when determining that the authentication information N is stored, the server controller 30 determines that the user authentication has been successfully performed.

When the user authentication has been successfully performed, the server controller 30 transmits the HTML file for displaying the print instruction operation screen through the server communication section 31 to the second multifunction peripheral 1B (step SK108). Note that, when determining that the user authentication has failed, the server controller 30 does not transmit the HTML file for displaying the print instruction operation screen to the second multifunction peripheral 1B.

When receiving the HTML file for displaying the print instruction operation screen through the multifunction peripheral communication section 11, the browser execution section 112 of the second multifunction peripheral 1B displays the print instruction operation screen using the multifunction peripheral display section 13 (step SK109).

The print instruction operation screen includes a software button to be operated by the user to perform a print instruction operation on the print instruction operation screen, for example.

The user P performs a print instruction operation on the print instruction operation screen displayed by the second multifunction peripheral 1B (step SK110).

The browser execution section 112 of the second multifunction peripheral 1B receives the print instruction operation performed by the user P (step SK111).

When receiving the print instruction operation, the browser execution section 112 of the second multifunction peripheral 1B transmits the print instruction request information to the server 3 through the multifunction peripheral communication section 11 (step SK 112). The print instruction request information includes the user ID 1133 of the user authentication successfully performed.

When receiving the print instruction request information, the server controller 30 transmits print instruction information indicating the print instruction to the second multifunction peripheral 1B through the server communication section 31 (step SK113). The print instruction information transmitted in step SK113 includes the user ID 1133 included in the print instruction request information and the access information 3232 associated with the user ID 1133 in the print job associated information DB 323.

After transmitting the print instruction information to the second multifunction peripheral 1B, the server controller 30 transmits an HTML file for displaying a reception completion screen for indicating completion of reception of the print instruction to the second multifunction peripheral 1B (step SK114).

The reception completion screen includes information on a notification of the reception of the print instruction and start of printing such a message as "Reception of print instruction has been completed. Printing is started."

When receiving the HTML file for displaying the reception completion screen through the multifunction peripheral communication section 11, the browser execution section 112 of the second multifunction peripheral 1B displays the reception completion screen using the multifunction peripheral display section 13 (step SK115).

Next, the print controller 111 of the second multifunction peripheral 1B transmits data request information for requesting the print job data 1131 to the first multifunction peripheral 1A using the multifunction peripheral communication section 11 based on the access information 3232 included in the print instruction information received from the server 3 by the browser execution section 112 (step SK116). The data request information includes the user ID 1133 included in the print instruction information, that is, the user ID 1133 of the user authentication successfully performed.

The print controller 111 of the first multifunction peripheral 1A specifies all print job data 1131 associated with the user ID 1133 included in the data request information received from the second multifunction peripheral 1B in the print job data management DB 123 (step SK117).

Thereafter, the print controller 111 of the first multifunction peripheral 1A transmits all the print job data 1131 specified in step SK117 to the second multifunction peripheral 1B through the multifunction peripheral communication section 11 (step SK118).

When receiving the print job data 1131 from the first multifunction peripheral 1A, the print controller 111 of the second multifunction peripheral 1B executes printing based on the received print job data 1131 (step SK119) so as to generate a printed matter for the user P based on the received print job data 1131 (step SK120).

Although the configuration in which the print controller 111 executes printing based on the print instruction information transmitted from the server 3 is illustrated in the sequence diagram of FIG. 4, the browser execution section 112 may generate the print instruction information and the print controller 111 may execute printing based on the print instruction information. This configuration will be described with reference to FIG. 5.

Figure 5:
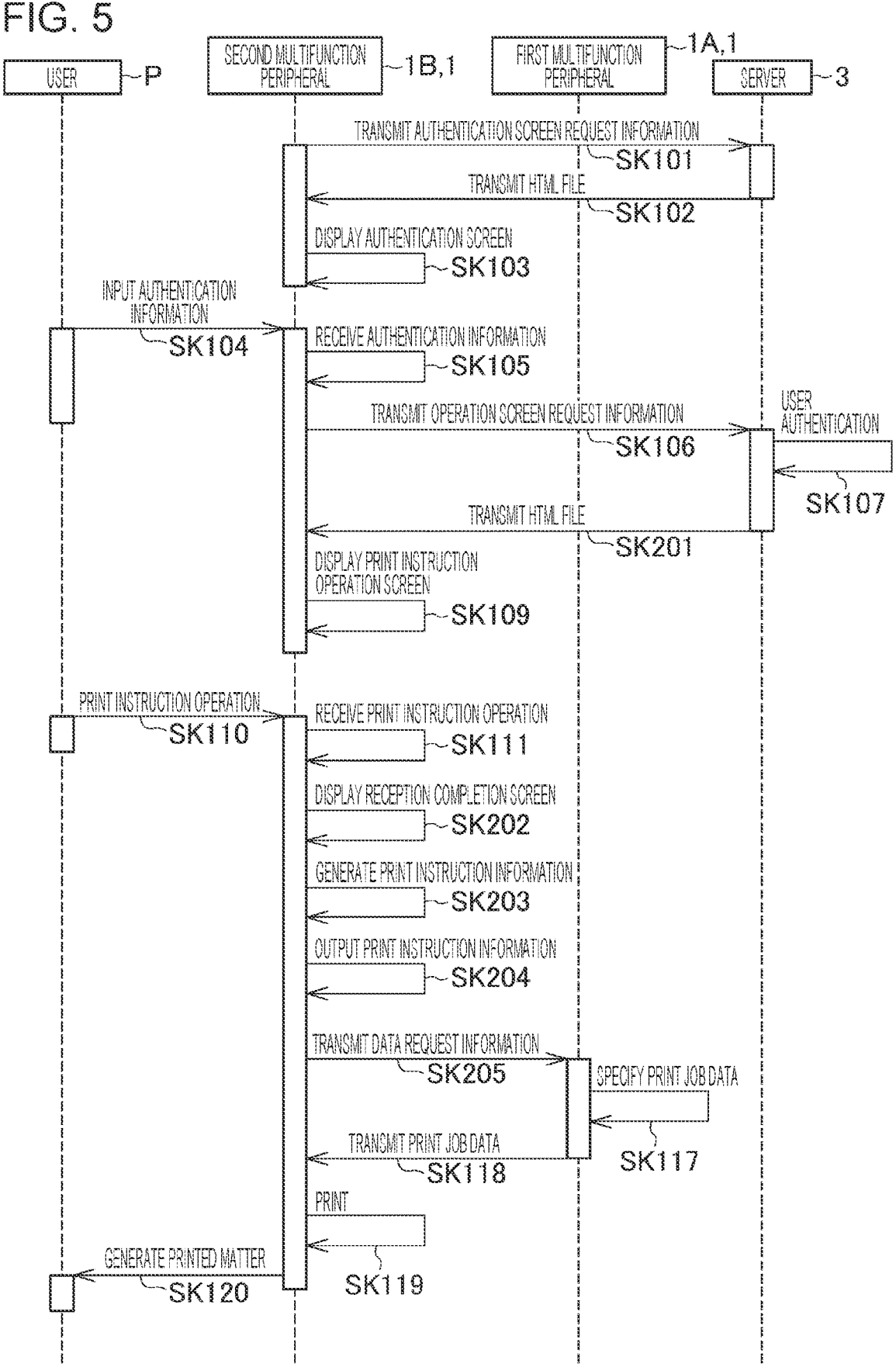
FIG. 5 is a sequence diagram illustrating operation of the print system.

FIG. 5 is a sequence diagram illustrating operation of the print system 1000. In FIG. 5, steps the same as those in the sequence diagram of FIG. 4 are denoted by reference numerals the same as those of FIG. 4 and descriptions thereof are omitted.

When the user authentication has been successfully performed, the server controller 30 transmits an HTML file for displaying a print instruction operation screen through the server communication section 31 to the second multifunction peripheral 1B (step SK201). Note that, when determining that the user authentication has failed, the server controller 30 does not transmit the HTML file for displaying the print instruction operation screen to the second multifunction peripheral 1B.

The HTML file transmitted in step SK201 includes the user ID 1133 of the user authentication successfully performed and the access information 3232 associated with the user ID 1133 in the print job associated information DB 323.

When receiving the print instruction operation (step SK111), the browser execution section 112 of the second multifunction peripheral 1B displays a reception completion screen using the multifunction peripheral display section 13 by using a function of a script included in the HTML file for displaying the print instruction operation screen (step SK202). The script included in the HTML file for displaying the print instruction operation screen corresponds to an example of a program included in screen information.

Next, the browser execution section 112 of the second multifunction peripheral 1B generates print instruction information by using a function of the script included in the HTML file for displaying the print instruction operation screen (step SK203). The print instruction information generated in step SK203 includes the user ID 1133 and the access information 3232 included in the HTML file for displaying the print instruction operation screen received from the server 3.

After generating the print instruction information, the browser execution section 112 of the second multifunction peripheral 1B outputs the generated print instruction information to the print controller 111 (step SK204).

The print controller 111 of the second multifunction peripheral 1B transmits data request information for requesting the print job data 1131 to the first multifunction peripheral 1A through the multifunction peripheral communication section 11 based on the access information 3232 included in the print instruction information output from the browser execution section 112 (step SK205). The data request information transmitted in step SK205 includes the user ID 1133 included in the print instruction information output from the browser execution section 112, that is, the user ID 1133 of the user authentication successfully performed.

Second Example

Next, operation of the print system 1000 in the second example will be described. In the description in the second example, the second multifunction peripheral 1B executing printing based on the print job data 1131 stored in the first multifunction peripheral 1A is illustrated.

Figure 6:
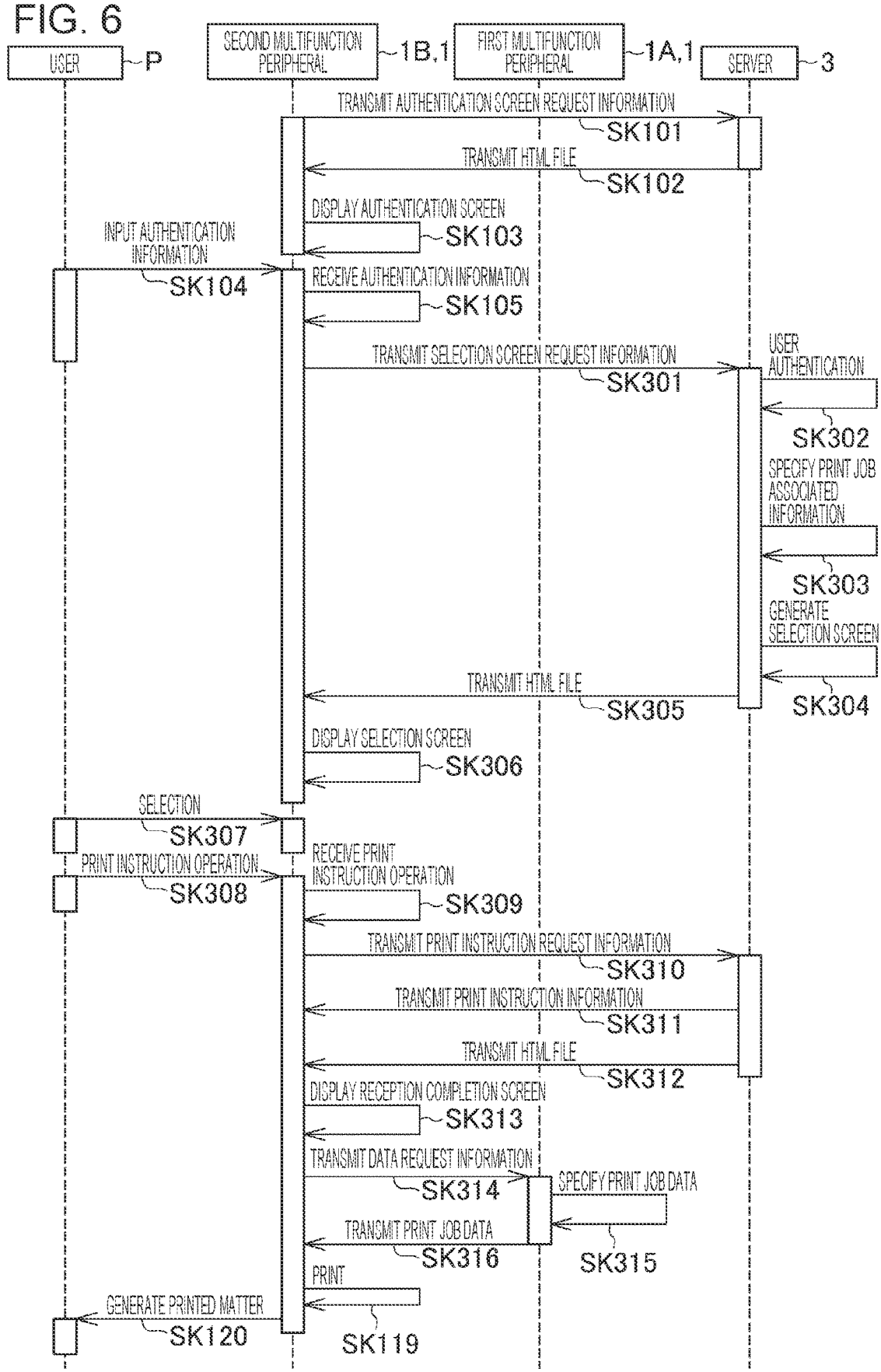
FIG. 6 is a sequence diagram illustrating operation of the print system.

FIG. 6 is a sequence diagram illustrating operation of the print system 1000. In FIG. 6, steps the same as those in the sequence diagram of FIG. 4 are denoted by reference numerals the same as those of FIG. 4 and descriptions thereof are omitted.

When receiving the authentication information NJ input by the user P (step SK105), the browser execution section 112 of the second multifunction peripheral 1B transmits selection screen request information to the server 3 through the multifunction peripheral communication section 11 (step SK 301).

The selection screen request information requests an HTML file for displaying a selection screen used to select the print job data 1131. The selection screen request information includes the authentication information NJ input by the user P. The selection screen corresponds to the screen for printing. Accordingly, the HTML file for displaying the selection screen corresponds to an example of screen information.

When receiving the selection screen request information, the server controller 30 performs user authentication based on the authentication information NJ included in the received selection screen request information (step SK302).

In step SK302, by referring to the authentication information DB 322, the server controller 30 determines whether the authentication information NJ included in the received selection screen request information is stored in the authentication information DB 322 as a single record. When determining that the authentication information NJ is not stored, the server controller 30 determines that the user authentication has failed, and when determining that the authentication information N is stored, the server controller 30 determines that the user authentication has been successfully performed.

When the user authentication is successfully performed, the server controller 30 specifies all print job associated information IKJ including the user ID 1133 of the user authentication successfully performed in the print job associated information DB 323 (step SK303).

After specifying the print job associated information IKJ, the server controller 30 generates a selection screen for selecting the print job data 1131 indicated by the print job ID 1132 included in the specified print job associated information IKJ based on the specified print job associated information IKJ (step SK304).

In the selection screen, a list of data names of the print job data 1131 of the user P of the user authentication successfully performed is displayed as a list of the print job data 1131, for example. Furthermore, the selection screen includes a software button for selecting at least one print job data 1131 in the list of the print job data 1131 of the user P of the user authentication successfully performed, for example. The selection screen includes a software button to be operated by the user P to perform a print instruction operation on the selection screen, for example.

Next, the server controller 30 transmits an HTML file for displaying the generated selection screen through the server communication section 31 to the second multifunction peripheral 1B (step SK305). The HTML file for displaying the selection screen includes the print job ID 1132 included in the print job associated information IKJ specified in step SK303.

Note that, when the user authentication has failed in step SK302, the server controller 30 does not generate the selection screen and does not transmit the HTML file for displaying the selection screen to the second multifunction peripheral 1B.

When receiving the HTML file for displaying the selection screen through the multifunction peripheral communication section 11, the browser execution section 112 of the second multifunction peripheral 1B displays the selection screen using the multifunction peripheral display section 13 (step SK306).

The user P selects at least one print job data 1131 to be executed by the second multifunction peripheral 1B in the selection screen displayed by the second multifunction peripheral 1B (step SK307).

Next, the user P performs a print instruction operation on the selection screen displayed in the second multifunction peripheral 1B (step SK308).

The browser execution section 112 of the second multifunction peripheral 1B receives the print instruction operation performed by the user P (step SK309).

When receiving the print instruction operation, the browser execution section 112 of the second multifunction peripheral 1B transmits the print instruction request information to the server 3 through the multifunction peripheral communication section 11 (step SK 310). The print instruction request information transmitted in step SK310 includes print job IDs 1132 of all the print job data 1131 selected by the user P in step SK307.

When receiving the print instruction request information, the server controller 30 transmits print instruction information to the second multifunction peripheral 1B through the server communication section 31 (step SK311). The print instruction information transmitted in step SK311 includes the print job ID 1132 included in the received print instruction request information and the access information 3232 associated with the print job ID 1132 in the print job associated information DB 323.

After transmitting the print instruction information to the second multifunction peripheral 1B, the server controller 30 transmits an HTML file for displaying a reception completion screen to the second multifunction peripheral 1B (step SK312).

When receiving the HTML file for displaying the reception completion screen through the multifunction peripheral communication section 11, the browser execution section 112 of the second multifunction peripheral 1B displays the reception completion screen using the multifunction peripheral display section 13 (step SK313).

Next, the print controller 111 of the second multifunction peripheral 1B transmits data request information for requesting the print job data 1131 to the first multifunction peripheral 1A through the multifunction peripheral communication section 11 based on the access information 3232 included in the print instruction information received from the server 3 by the browser execution section 112 (step SK314). The data request information includes the print job ID 1132 included in the print instruction information.

The print controller 111 of the first multifunction peripheral 1A specifies all print job data 1131 associated with the print job ID 1132 included in the data request information received from the second multifunction peripheral 1B in the print job data management DB 123 (step SK315).

Thereafter, the print controller 111 of the first multifunction peripheral 1A transmits all the print job data 1131 specified in step SK315 to the second multifunction peripheral 1B through the multifunction peripheral communication section 11 (step SK316).

Although the configuration in which the print controller 111 executes printing based on the print instruction information transmitted from the server 3 is illustrated in the sequence diagram of FIG. 6, the browser execution section 112 may generate the print instruction information and the print controller 111 may execute printing based on the print instruction information. This configuration will be described with reference to FIG. 7.

FIG. 7 is a sequence diagram illustrating operation of the print system 1000. In FIG. 7, steps the same as those in the sequence diagram of FIG. 6 are denoted by reference numerals the same as those of FIG. 6 and descriptions thereof are omitted.

After generating the selection screen (step SK304), the server controller 30 transmits the HTML file for displaying the generated selection screen through the server communication section 31 to the second multifunction peripheral 1B (step SK401).

The HTML file transmitted in step SK401 includes the print job ID 1132 specified in step SK303 and the access information 3232 associated with the print job ID 1132 in the print job associated information DB 323.

When receiving the print instruction operation (step SK309), the browser execution section 112 of the second multifunction peripheral 1B displays a reception completion screen using the multifunction peripheral display section 13 by using a function of a script included in the HTML file for displaying the selection screen (step SK402). The script included in the HTML file for displaying the selection screen corresponds to an example of a program included in screen information.

Next, the browser execution section 112 of the second multifunction peripheral 1B generates print instruction information by using a function of the script included in the HTML file for displaying the selection screen (step SK403). The print instruction request information generated in step SK403 includes the print job ID 1132 of the print job data 1131 selected by the user P in step SK307 and the access information 3232 corresponding to the print job ID 1132.

After generating the print instruction information, the browser execution section 112 of the second multifunction peripheral 1B outputs the generated print instruction information to the print controller 111 (step SK404).

As described above, the print system 1000 includes the first multifunction peripheral 1A, the second multifunction peripheral 1B capable of communicating with the first multifunction peripheral 1A, and the server 3 capable of communicating with the first multifunction peripheral 1A and the second multifunction peripheral 1B. The first multifunction peripheral 1A receives the print job data 1131 from the terminal device 2 and stores the received print job data 1131. The server 3 transmits the HTML file of the screen for printing associated with printing to be performed based on the print job data 1131 to the second multifunction peripheral 1B. When the screen for printing is displayed based on the HTML file of the screen for printing received from the server 3 and the print instruction operation is performed on the displayed screen for printing, the second multifunction peripheral 1B receives the print job data 1131 stored in the first multifunction peripheral 1A from the first multifunction peripheral 1A and executes printing based on the received print job data 1131.

The second multifunction peripheral 1B includes the multifunction peripheral communication section 11 capable of communicating with the terminal device 2, the first multifunction peripheral 1A, and the server 3, the print section 14, the multifunction peripheral display section 13, and the multifunction peripheral controller 10. The multifunction peripheral controller 10 receives the HTML file of the screen for printing from the server 3 through the multifunction peripheral communication section 11 and displays the screen for printing in the multifunction peripheral display section 13 based on the received HTML file of the screen for printing. When the print instruction operation is performed on the screen for printing displayed on the multifunction peripheral display section 13, the multifunction peripheral controller 10 receives the print job data 1131 stored in the first multifunction peripheral 1A from the first multifunction peripheral 1A through the multifunction peripheral communication section 11 and executes printing based on the received print job data 1131.

The server 3 includes the server communication section 31 communicated with the first multifunction peripheral 1A storing the print job data 1131 received from the terminal device 2 and the second multifunction peripheral 1B, and the server controller 30 that transmits the HTML file of the screen for printing to the second multifunction peripheral 1B through the server communication section 31. When the print instruction operation is performed on the screen for printing, the HTML file of the screen for printing includes a script for causing the second multifunction peripheral 1B to receive the print job data 1131 stored in the first multifunction peripheral 1A from the first multifunction peripheral 1A and execute printing based on the received print job data 1131.

In a printing method using the first multifunction peripheral 1A, the second multifunction peripheral 1B, and the server 3, the first multifunction peripheral 1A receives the print job data 1131 from the terminal device 2 and stores the received print job data 1131, the server 3 transmits the HTML file of the screen for printing to the second multifunction peripheral 1B, and the second multifunction peripheral 1B displays the screen for printing based on the HTML file of the screen for printing received from the server 3 and when the print instruction operation is performed on the displayed screen for printing, receives the print job data 1131 stored in the first multifunction peripheral 1A from the first multifunction peripheral 1A and executes printing based on the received print job data 1131.

According to the print system 1000, the second multifunction peripheral 1B, the server 3, and the printing method, when the second multifunction peripheral 1B executes printing based on the print job data 1131 stored in the first multifunction peripheral 1A through the communication with the server 3, the server 3 does not transmit or receive the print job data 1131. Therefore, according to the print system 1000, the second multifunction peripheral 1B, the server 3, and the printing method, when the second multifunction peripheral 1B executes printing based on the print job data 1131 stored in the first multifunction peripheral 1A, the amount of communication in the print system 1000 may be suppressed. Furthermore, since the server 3 does not transmit or receive the print job data 1131, the print job data 1131 is not transmitted through the global network GN. Therefore, the print system 1000, the second multifunction peripheral 1B, the server 3, and the printing method may improve security of the print job data 1131 and suppress increase in a communication cost in the print system 1000.

When the print instruction operation is performed on the displayed screen for printing, the second multifunction peripheral 1B transmits print instruction request information for requesting a print instruction to the server 3. When receiving the print instruction request information from the second multifunction peripheral 1B, the server 3 transmits print instruction information indicating a print instruction to the second multifunction peripheral 1B. When receiving the print instruction information from the server 3, the second multifunction peripheral 1B receives the print job data 1131 stored in the first multifunction peripheral 1A from the first multifunction peripheral 1A and executes printing based on the received print job data 1131.

According to this configuration, the second multifunction peripheral 1B executes printing in response to the print instruction supplied from the server 3. Therefore, the second multifunction peripheral 1B may execute printing in response to the print instruction supplied from the server 3 based on the print job data 1131 stored in the first multifunction peripheral 1A while the amount of communication in the print system 1000 is suppressed.

When the print instruction operation is performed on the displayed screen for printing, the second multifunction peripheral 1B receives the print job data 1131 stored in the first multifunction peripheral 1A from the first multifunction peripheral 1A based on the print instruction information indicating a print instruction generated by the script included in the HTML file of the screen for printing and executes printing based on the received print job data 1131.

According to this configuration, the second multifunction peripheral 1B may execute printing based on the print job data 1131 without communicating with the server 3 after receiving the HTML file of the screen for printing from the server 3, and therefore, the amount of communication in the print system 1000 may be further suppressed.

The screen for printing is a selection screen for selecting the print job data 1131. The server 3 receives the print job associated information IKJ associated with the print job data 1131 transmitted by the terminal device 2 from the terminal device 2, generates a selection screen based on the received print job associated information IKJ, and transmits an HTML file of the generated selection screen to the second multifunction peripheral 1B.

According to this configuration, the second multifunction peripheral 1B may display the selection screen for selecting the print job data 1131 stored in the first multifunction peripheral 1A. Therefore, even when the print job data 1131 desired by the user P is stored in one of the multifunction peripherals 1 which is different from the multifunction peripheral 1 executing the printing, the user P may easily select the desired print job data 1131 in the multifunction peripheral 1 executing the printing. Furthermore, when the selection screen is displayed, the print job data 1131 is not transmitted or received by the server 3. Therefore, according to this configuration, even when the print job data 1131 desired by the user P is stored in one of the multifunction peripherals 1 which is different from the multifunction peripheral 1 executing the printing, the user P may easily select the desired print job data 1131 using the multifunction peripheral 1 executing the printing while the amount of communication of the print system 1000 is suppressed.

The second multifunction peripheral 1B receives an input of the authentication information NJ from the user P and transmits the received authentication information NJ to the server 3. The server 3 performs user authentication based on the received authentication information NJ, transmits the HTML file of the screen for printing to the second multifunction peripheral 1B when the user authentication is successfully performed, and does not transmit the HTML file of the screen for printing when the user authentication fails.

According to this configuration, the HTML file of the screen for printing is transmitted to the second multifunction peripheral 1B when the user authentication is successfully performed whereas the HTML file is not transmitted to the second multifunction peripheral 1B when the user authentication fails. Therefore, the print system 1000 may prevent execution of printing based on the print job data 1131 of a person other than the user P of the user authentication successfully performed.

The server 3 transmits the HTML file of the screen for printing associated with printing to be performed based on the print job data 1131 of the user P of the user authentication successfully performed to the second multifunction peripheral 1B. The second multifunction peripheral 1B executes printing based on the print job data 1131 of the user P of the user authentication successfully performed in the print job data 1131 stored in the second multifunction peripheral 1B.

According to this configuration, since printing may be executed based on the print job data 1131 of the user of the user authentication successfully performed, printing based on print job data 1131 of a person other than the user P is prevented from being performed by the user P. Accordingly, the print system 1000 may improve security of the print job data 1131.

Second Embodiment

Next, a second embodiment will be described.

In the description of the second embodiment, components the same as those of the multifunction peripherals 1, the terminal device 2, and the server 3 according to the first embodiment are denoted by reference numerals the same as those of the first embodiment and detailed descriptions thereof are omitted.

FIGS. 8A and 8B are block diagrams illustrating functional configurations of multifunction peripherals 1, a terminal device 2, and a server 3 according to the second embodiment.

As is apparent from comparison between FIGS. 8A and 8B and FIGS. 2A and 2B, in the second embodiment, the server 3 does not include the print job associated information DB 323. Furthermore, in the second embodiment, the multifunction peripherals 1 store print job associated information IKJ in a print job data management DB 123.

A single record stored in the print job data management DB 123 of the second embodiment includes print job data 1131 and the print job associated information IKJ.

Next, operation of a print system 1000 according to the second embodiment will be described.

First, operation of the print system 1000 performed until the multifunction peripheral 1 stores the print job data 1131 in the print job data management DB 123 will be described.

Figure 9:
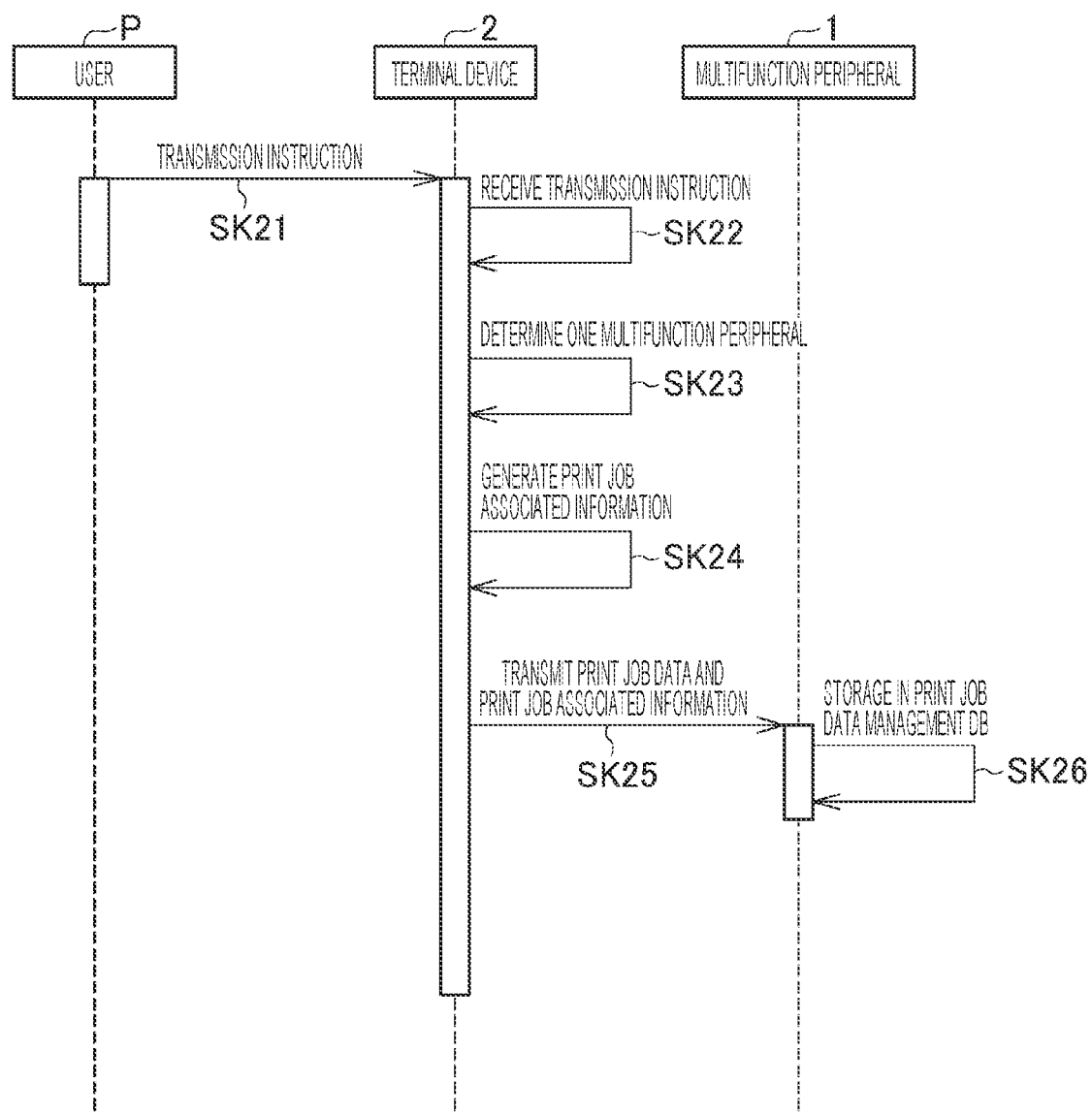
FIG. 9 is a sequence diagram illustrating operation of a print system.

FIG. 9 is a sequence diagram illustrating operation of the print system 1000. It is assumed that, at a time point of starting the sequence in FIG. 9, the terminal device 2 generates the print job data 1131 based on an operation performed by the user P.

The user P performs a transmission instruction for transmitting the print job data 1131 generated by the terminal device 2 to the multifunction peripheral 1 to the terminal device 2 (step SK21).

When receiving the transmission instruction issued by the user P (step SK22), a driver execution section 212 of the terminal device 2 determines one of the multifunction peripherals 1 to which the generated print job data 1131 is to be transmitted (step SK23). The driver execution section 212 may determine a predetermined one of the multifunction peripherals 1 or may determine one of the multifunction peripherals 1 in accordance with a predetermined criterion or predetermined order among the multifunction peripherals 1 connected to the local network LN.

When determining one of the multifunction peripherals 1 to which the print job data 1131 is to be transmitted, the driver execution section 212 generates print job associated information IKJ (step SK24). For example, the driver execution section 212 executes the same process as the process illustrated in step SK14 so as to generate the print job associated information IKJ.

Next, the driver execution section 212 transmits the generated print job data 1131 and the print job associated information IKJ associated with each other through a terminal communication section 21 to the multifunction peripheral 1 determined in step SK23 (step SK25).

When receiving the print job data 1131 and the print job associated information IKJ, the multifunction peripheral controller 10 of the multifunction peripheral 1 stores a record including the received print job data 1131 and the received print job associated information IKJ in the print job data management DB 123 (step SK26).

Next, operation of the print system 1000 according to the second embodiment performed after the multifunction peripheral 1 stores the print job data 1131 in the print job data management DB 123 will be described. Also in this embodiment, as with the first embodiment, the description of operation of the print system 1000 is made in first and second examples.

First Example

First, operation of the print system 1000 in the first example will be described. In the description in the first example, the second multifunction peripheral 1B executing printing based on the print job data 1131 stored in one of the first multifunction peripherals 1A will be illustrated.

In the first example, the print system 1000 according to the second embodiment executes the operation illustrated in the sequence diagram in FIG. 4 or FIG. 5.

Second Example

Next, operation of the print system 1000 in the second example will be described. In the description in the second example, the second multifunction peripheral 1B executing printing based on the print job data 1131 stored in the first multifunction peripheral 1A is illustrated.

Figure 10:
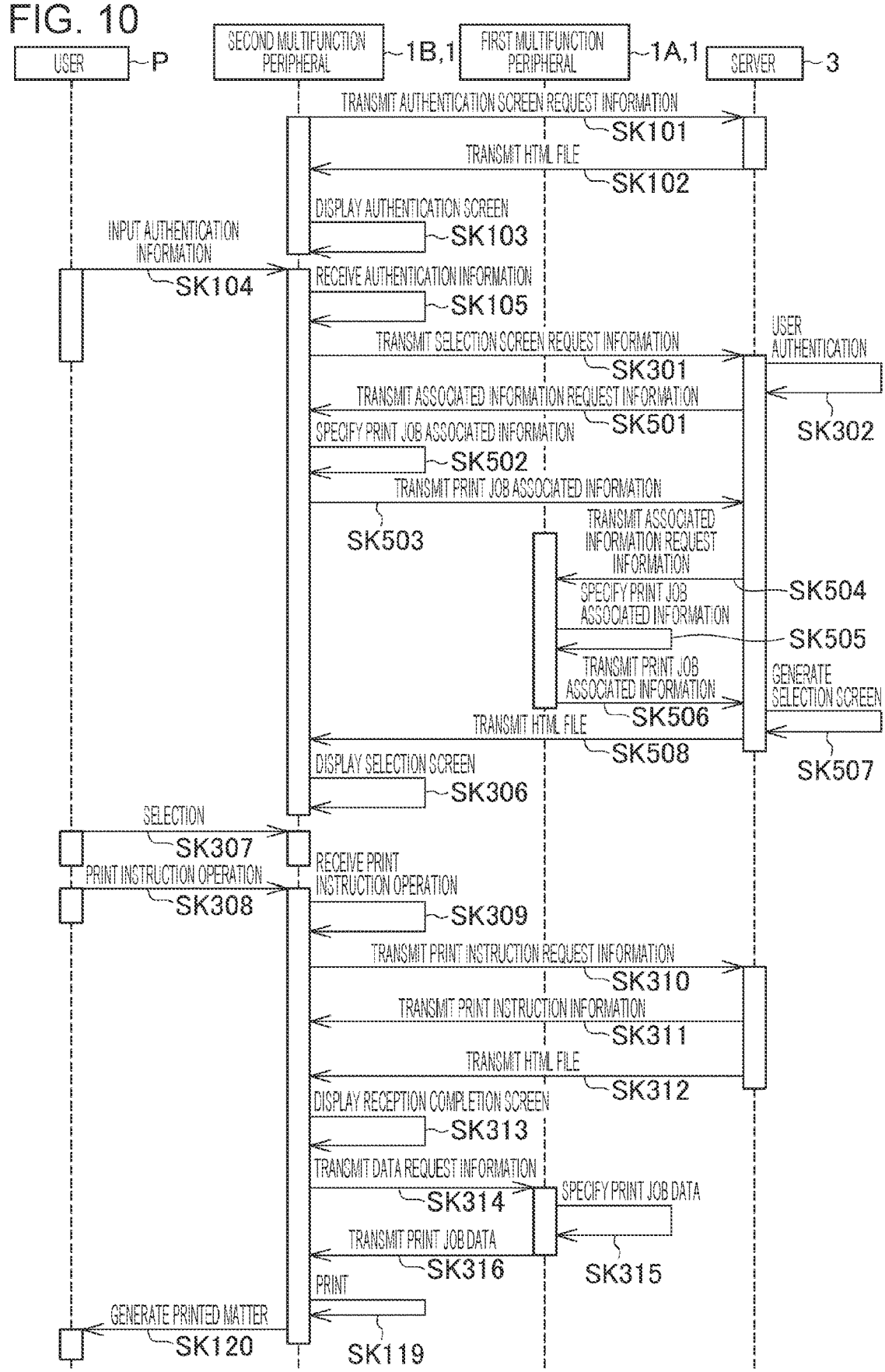
FIG. 10 is a sequence diagram illustrating operation of the print system.

FIG. 10 is a sequence diagram illustrating operation of the print system 1000. In FIG. 10, steps the same as those in the sequence diagram of FIG. 6 are denoted by reference numerals the same as those of FIG. 6 and descriptions thereof are omitted.

When user authentication is successfully performed, a server controller 30 transmits associated information request information to the second multifunction peripheral 1B through a server communication section 31 (step SK501).

The associated information request information requests the print job associated information IKJ including the user ID 1133 of the user authentication successfully performed. The associated information request information includes the user ID 1133 of the user authentication successfully performed. Note that the server controller 30 does not transmit the associated information request information to the multifunction peripheral 1 when the user authentication has failed.

When receiving the associated information request information from the server 3, the browser execution section 112 of the second multifunction peripheral 1B specifies all print job associated information IKJ including the user ID 1133 included in the received associated information request information in the print job data management DB 123 (step SK502).

Next, the driver execution section 112 of the second multifunction peripheral 1B transmits the print job associated information IKJ specified in step SK502 to the server 3 (step SK503).

When the user authentication is successfully performed, the server controller 30 transmits the associated information request information to the first multifunction peripheral 1A through the server communication section 31 (step SK504). When a plurality of first multifunction peripherals 1A are provided, the server controller 30 transmits the associated information request information to all the first multifunction peripherals 1A in step SK504.

When receiving the associated information request information from the server 3, the browser execution section 112 of the first multifunction peripheral 1A specifies all the print job associated information IKJ including the user ID 1133 included in the received associated information request information in the print job data management DB 123 (step SK505).

Next, the driver execution section 112 of the first multifunction peripheral 1A transmits the print job associated information IKJ specified in step SK505 to the server 3 (step SK506).

The server controller 30 generates a selection screen for selecting the print job data 1131 of the user P based on the print job associated information IKJ received from at least one first multifunction peripheral 1A and the second multifunction peripheral 1B (step SK507). The selection screen generated in step SK507 is the same as that illustrated in the first embodiment.

Next, the server controller 30 transmits the HTML file for displaying the generated selection screen through the server communication section 31 to the second multifunction peripheral 1B (step SK508). The HTML file for displaying the selection screen includes all the print job ID 1132 included in the print job associated information IKJ received from the first multifunction peripheral 1A and the second multifunction peripheral 1B. The HTML file for displaying the selection screen transmitted in step SK508 corresponds to an example of screen information.

Although the configuration in which the server 3 generates the selection screen for selecting the print job data 1131 of the user ID 1133 of the user authentication successfully performed is illustrated in the sequence diagram in FIG. 10, the browser execution section 112 of the second multifunction peripheral 1B may generate the selection screen. This configuration will be described with reference to FIG. 11.

Figure 11:
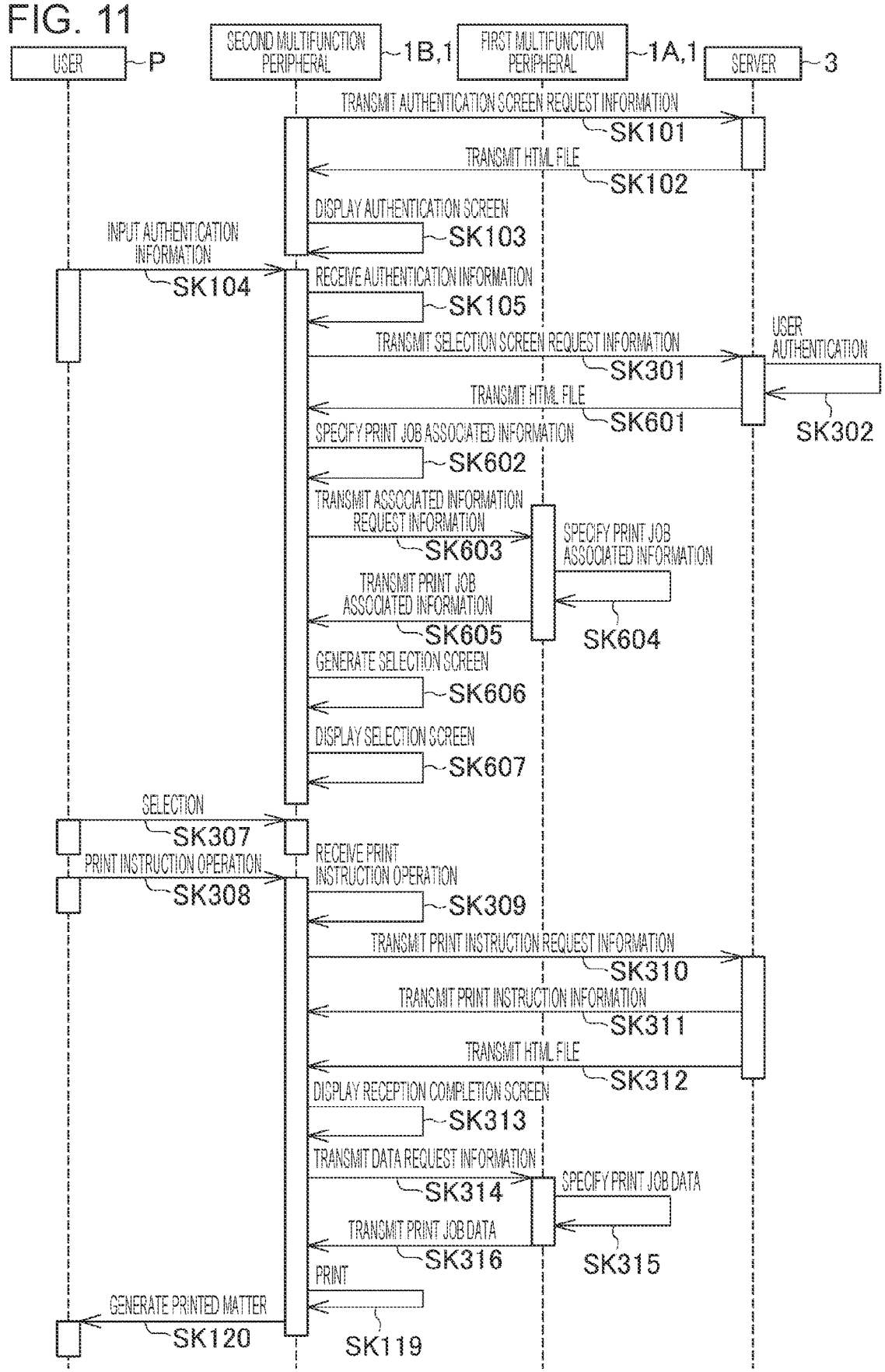
FIG. 11 is a sequence diagram illustrating operation of the print system.

FIG. 11 is a sequence diagram illustrating operation of the print system 1000. In FIG. 11, steps the same as those in the sequence diagram of FIG. 10 are denoted by reference numerals the same as those of FIG. 10 and descriptions thereof are omitted.

When the user authentication has been successfully performed, the server controller 30 transmits the HTML file for displaying the selection screen through the server communication section 31 to the second multifunction peripheral 1B (step SK601). The HTML file for displaying the selection screen includes the user ID 1133 of the user authentication successfully performed. The HTML file for displaying the selection screen corresponds to an example of screen information. Note that, when the user authentication has failed, the server controller 30 does not transmit the HTML file for displaying the selection screen to the multifunction peripheral 1.

When receiving the HTML file for displaying the selection screen, the browser execution section 112 of the second multifunction peripheral 1B specifies the print job associated information IKJ including the user ID 1133 included in the HTML file in the print job data management DB 123 by using a function of a script included in the received HTML file (step SK602).

Next, the browser execution section 112 of the second multifunction peripheral 1B transmits the associated information request information to the first multifunction peripheral 1A by using the function of the script included in the HTML file for displaying the selection screen (step SK603). When a plurality of first multifunction peripherals 1A are provided, the browser execution section 112 of the second multifunction peripheral 1B transmits the associated information request information to all the first multifunction peripherals 1A in step SK603.

When receiving the associated information request information from the second multifunction peripheral 1B, the browser execution section 112 of the first multifunction peripheral 1A specifies all the print job associated information IKJ including the user ID 1133 included in the received associated information request information in the print job data management DB 123 (step SK604).

Next, the browser execution section 112 of the first multifunction peripheral 1A transmits the print job associated information IKJ specified in step SK604 to the second multifunction peripheral 1B (step SK605).

Next, the browser execution section 112 of the second multifunction peripheral 1B generates a selection screen for selecting the print job data 1131 of the user P using the function of the script included in the received HTML file for displaying the selection screen based on the specified print job associated information IKJ and the print job associated information IKJ received from at least one first multifunction peripheral 1A (step SK606). The script included in the HTML file for displaying the selection screen corresponds to an example of a program included in screen information.

Thereafter, the browser execution section 112 of the second multifunction peripheral 1B displays the generated selection screen in the multifunction peripheral display section 13 by using the function of the script included in the HTML file for displaying the selection screen received from the server 3 (step SK607).

Although the configuration in which the print controller 111 executes printing based on the print instruction information transmitted from the server 3 is illustrated in the sequence diagrams of FIGS. 10 and 11, the browser execution section 112 of the second multifunction peripheral 1B may generate the print instruction information and the print controller 111 may execute printing based on the print instruction information. This configuration will be described with reference to FIG. 12.

Figure 12:
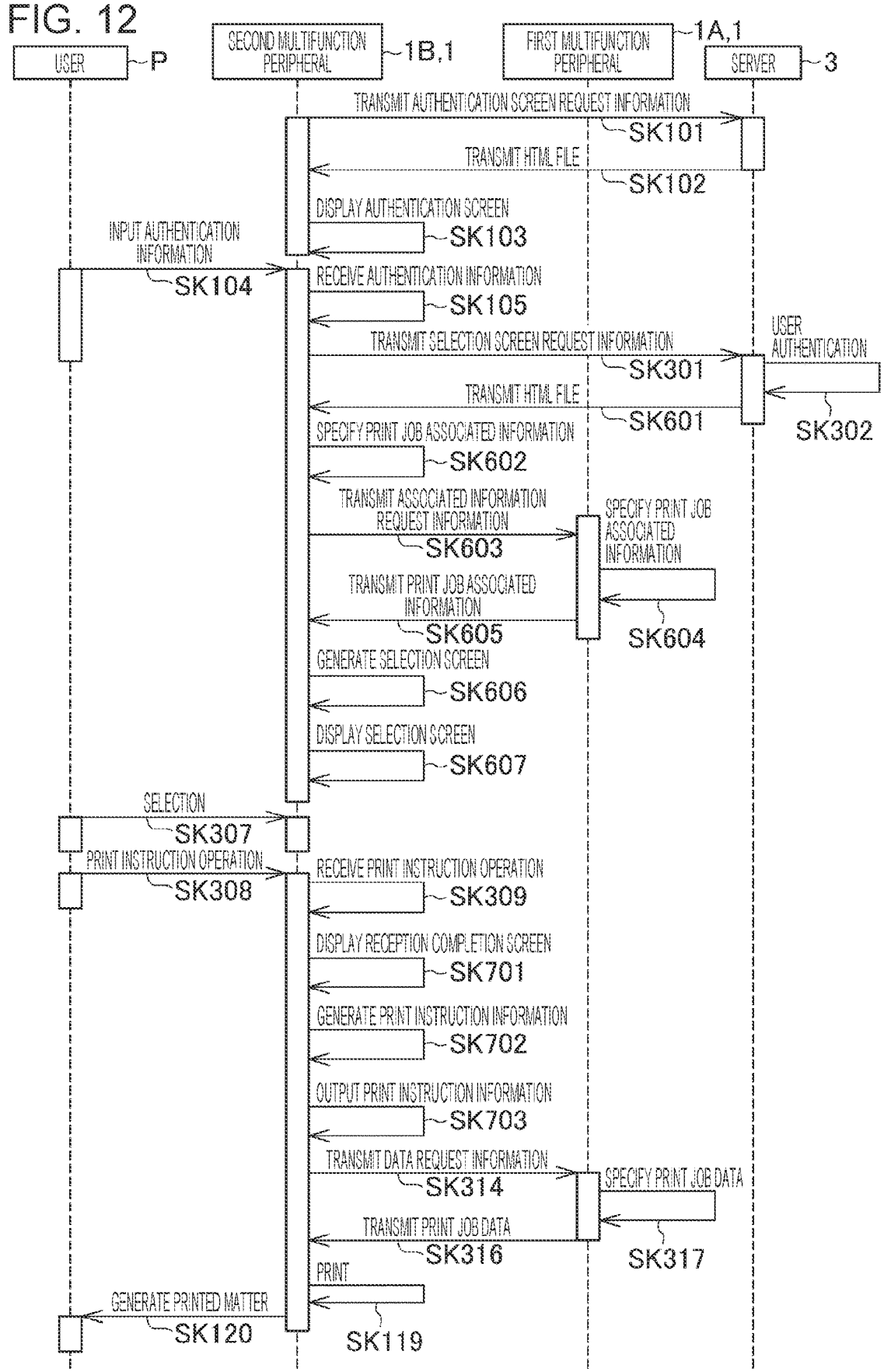
FIG. 12 is a sequence diagram illustrating operation of the print system.

FIG. 12 is a sequence diagram illustrating operation of the print system 1000. In FIG. 12, steps the same as those in the sequence diagram of FIG. 11 are denoted by reference numerals the same as those of FIG. 11 and descriptions thereof are omitted.

When receiving the print instruction operation (step SK309), the browser execution section 112 of the second multifunction peripheral 1B displays a reception completion screen in the multifunction peripheral display section 13 by using the function of the script included in the HTML file for displaying the selection screen received from the server 3 (step SK701). The script included in the HTML file for displaying the selection screen corresponds to an example of a program included in screen information.

Next, the browser execution section 112 of the second multifunction peripheral 1B generates print instruction information by using the function of the script included in the HTML file for displaying the selection screen received from the server 3 (step SK702). The print instruction information generated in step SK702 includes a print job ID 1132 of the print job data 1131 selected by the user P in step SK307 and access information 3232 corresponding to the print job ID 1132.

After generating the print instruction information, the browser execution section 112 of the second multifunction peripheral 1B outputs the generated print instruction information to the print controller 111 (step SK703).

As described above, according to the second embodiment, effects the same as those of the first embodiment are attained.

Furthermore, as described above, the screen for printing corresponds to the selection screen for selecting the print job data 1131 in the second embodiment. The first multifunction peripheral 1A transmits the print job associated information IKJ associated with the print job data 1131 received from the terminal device 2 to the server 3. The server 3 generates the selection screen based on the received print job associated information IKJ and transmits the HTML file of the generated selection screen to the second multifunction peripheral 1B.

According to this configuration, the second multifunction peripheral 1B may display the selection screen for selecting the print job data 1131 stored in the first multifunction peripheral 1A. Therefore, even when the print job data 1131 desired by the user P is stored in one of the multifunction peripherals 1 which is different from the multifunction peripheral 1 executing the printing, the user P may easily select the desired print job data 1131 using the multifunction peripheral 1 executing the printing. Furthermore, when the selection screen is displayed, transmission or reception of information is not performed by the server 3 after the HTML file for displaying the selection screen is transmitted. Therefore, according to this configuration, even when the print job data 1131 desired by the user P is stored in one of the multifunction peripherals 1 which is different from the multifunction peripheral 1 executing the printing, the user P may easily select the desired print job data 1131 using the multifunction peripheral 1 executing the printing while the amount of communication of the print system 1000 is further suppressed.

The print system 1000 includes a plurality of first multifunction peripherals 1A. The plurality of first multifunction peripherals 1A transmit the print job associated information IKJ associated with the print job data 1131 received from the terminal device 2 to the server 3. The second multifunction peripheral 1B transmits the print job associated information IKJ associated with the print job data 1131 received from the terminal device 2 to the server 3. The server 3 generates the selection screen based on the received print job associated information IKJ and transmits the HTML file of the generated selection screen to the second multifunction peripheral 1B.

According to this configuration, since the selection screen for selecting the print job data 1131 stored in the plurality of first multifunction peripherals 1A is displayed by the second multifunction peripheral 1B, the user P may easily select the print job data 1131 to be executed by the second multifunction peripheral 1B even when the print job data 1131 desired by the user P to be executed is stored in any one of the multifunction peripherals 1. Therefore, according to this configuration, even when the print job data 1131 is stored in any one of the multifunction peripherals 1, the user P may easily select the print job data 1131 to be executed by the second multifunction peripheral 1B while the amount of communication of the print system 1000 is suppressed.

The foregoing embodiments are only modes of the present disclosure and a modification may be made or an application may be made within the scope of the present disclosure.

For example, although the serial ink jet method is illustrated as a print method of the multifunction peripherals 1 in the foregoing embodiments, the print method of the multifunction peripherals 1 may be a line ink jet method. Furthermore, the print method of the multifunction peripherals is not limited to the ink jet method, and other print methods may be employed. Although the multifunction peripherals 1 are illustrated as a print apparatus, the print apparatus is not limited to the multifunction peripherals 1 and may be a print apparatus that does not have a scanning function, such as a printer. Furthermore, the multifunction peripherals 1 may have further various functions including a facsimile function.

Furthermore, the functions of the multifunction peripheral controller 10, the terminal controller 20, and the server controller 30 may be realized by a plurality of processors or a plurality of semiconductor chips.

Moreover, the sections illustrated in FIGS. 2A and 2B and FIGS. 8A and 8B are merely examples and concrete embodiments are not limited. Specifically, it is not necessarily the case that hardware individually corresponding to various sections is implemented, and a configuration in which one processor executes programs so as to realize functions of the sections may be employed. Furthermore, in the foregoing embodiments, a number of the functions realized as software may be realized as hardware or a number of the functions realized by hardware may be realized by software. Moreover, detailed configurations of the sections included in the multifunction peripheral 1, the terminal device 2, and the server 3 may be arbitrarily changed without departing from the scope of the present disclosure.

Furthermore, a unit of steps of the operations illustrated in FIGS. 3 to 7 and FIGS. 9 to 12 are obtained by division according to main processing contents for facilitating understanding of operations of the devices included in the print system 1000, and the present disclosure is not limited by a method and a name of the division of a processing unit. The process may be divided in a larger number of step units in accordance with processing content. Furthermore, one step unit may be divided such that one step unit includes a larger number of processes. In addition, order of the steps may be appropriately changed within the scope of the present disclosure.

What is claimed is:

1. A print system comprising a first print apparatus, a second print apparatus configured to communicate with the first print apparatus, and a server configured to communicate with the first print apparatus and the second print apparatus, wherein
the first print apparatus
receives print job data from a terminal device and stores the received print job data,
the server
transmits screen information that is information on a screen associated with printing based on the print job data to the second print apparatus, and
the second print apparatus
displays, based on the screen information received from the server, the screen and, when a print instruction operation is performed on the displayed screen, receives the print job data stored in the first print apparatus from the first print apparatus and executes printing based on the received print job data,
wherein the first print apparatus is different from the second print apparatus.

2. The print system according to claim 1, wherein
the second print apparatus
transmits print instruction request information for requesting a print instruction to the server when a print instruction operation is performed on the displayed screen,
the server
transmits print instruction information indicating the print instruction to the second print apparatus when the server receives the print instruction request information from the second print apparatus, and
the second print apparatus
receives the print job data stored in the first print apparatus from the first print apparatus when the second print apparatus receives the print instruction information from the server, and executes printing based on the received print job data.

3. The print system according to claim 1, wherein
the second print apparatus
receives, based on print instruction information indicating a print instruction generated by a program included in the screen information, the print job data stored in the first print apparatus from the first print apparatus and executes printing based on the received print job data when a print instruction operation is performed on the displayed screen.

4. The print system according to claim 1, wherein
the screen corresponds to a selection screen for selecting the print job data, and
the server
receives, from the terminal device, print job associated information associated with the print job data transmitted from the terminal device, and
generates, based on the received print job associated information, the selection screen and transmits screen information of the generated selection screen to the second print apparatus.

5. The print system according to claim 1, wherein
the screen corresponds to a selection screen for selecting the print job data,
the first print apparatus
transmits, to the server, print job associated information associated with the print job data received from the terminal device, and
the server
generates, based on the received print job associated information, the selection screen and transmits screen information of the generated selection screen to the second print apparatus.

6. The print system according to claim 5, wherein
the first print apparatus includes a plurality of first print apparatuses,
the plurality of first print apparatuses transmit, to the server, print job associated information associated with the print job data received from the terminal device,
the second print apparatus transmits, to the server, the print job associated information associated with the print job data received from the terminal device, and
the server generates, based on the received print job associated information, the selection screen and transmits the screen information of the generated selection screen to the second print apparatus.

7. The print system according to claim 1, wherein
the second print apparatus receives an input of authentication information performed by a user and transmits the received authentication information to the server, and the server
performs, based on the received authentication information, user authentication, and transmits screen information to the second print apparatus when the user authentication is successfully performed and does not transmit the screen information to the second print apparatus when the user authentication fails.

8. The print system according to claim 7, wherein
the server
transmits, to the second print apparatus, screen information of a screen associated with printing based on print job data of a user of which user authentication is successfully performed, and the second print apparatus
receives, from the first print apparatus, the print job data of the user of which the user authentication is successfully performed among the print job data stored in the first print apparatus and executes printing based on the received print job data when a print instruction operation is performed on the displayed screen.

9. A server comprising:
a server communication section that communicates with a first print apparatus, storing print job data supplied from a terminal device, and a second print apparatus; and
a server controller that transmits, to the second print apparatus through the server communication section, screen information that is information on a screen associated with printing based on the print job data, which is received from the terminal device not via the server and which is stored in the first print apparatus, wherein
the screen information includes a program for causing, when a print instruction operation is performed on the screen, the second print apparatus to receive the print job data stored in the first print apparatus from the first print apparatus and to execute printing based on the received print job data, wherein the first print apparatus is different from the second print apparatus.

* * * * *